US012808660B2

(12) United States Patent
Ouellet et al.

(10) Patent No.: US 12,808,660 B2
(45) Date of Patent: Nov. 24, 2026

(54) 3D SCANNER WITH STRUCTURED LIGHT PATTERN PROJECTOR AND METHOD OF USING SAME FOR PERFORMING LIGHT PATTERN MATCHING AND 3D RECONSTRUCTION

(71) Applicant: CREAFORM INC., Levis (CA)

(72) Inventors: Jean-Nicolas Ouellet, Saint-Augustin (CA); Felix Rochette, Quebec (CA); Eric St-Pierre, Levis (CA)

(73) Assignee: CREAFORM INC., Lévis (CA)

(*) Notice: Subject to any disclaimer, the term of this patent is extended or adjusted under 35 U.S.C. 154(b) by 225 days.

(21) Appl. No.: 18/569,303

(22) PCT Filed: May 20, 2022

(86) PCT No.: PCT/CA2022/050804
§ 371 (c)(1),
(2) Date: Dec. 12, 2023

(87) PCT Pub. No.: WO2023/220804
PCT Pub. Date: Nov. 23, 2023

(65) Prior Publication Data

US 2024/0288267 A1 Aug. 29, 2024

(51) Int. Cl.
*G01B 11/25* (2006.01)
*G06T 7/521* (2017.01)

(52) U.S. Cl.
CPC ........ *G01B 11/2545* (2013.01); *G01B 11/254* (2013.01); *G06T 7/521* (2017.01); *G06T 2207/10028* (2013.01)

(58) Field of Classification Search
CPC ... G01B 11/25; G01B 11/2513; G01B 11/002; G01B 11/2545; G01B 11/005;
(Continued)

(56) References Cited

U.S. PATENT DOCUMENTS 6,549,288 B1 * 4/2003 Migdal .................. G06T 7/521
356/601
7,274,470 B2 9/2007 Lemelin et al.
(Continued)

FOREIGN PATENT DOCUMENTS

CA 2686904 A1 6/2011
CA 2945256 A1 * 4/2018 ............ H04N 23/60
(Continued)

OTHER PUBLICATIONS

Notification of Grant of Patent Right issued on Mar. 21, 2024 in connection with Chinese Utility Patent Application No. 202321216387.5 (with English Summary)—3 pages.
(Continued)

*Primary Examiner* — Michael P Stafira
(74) *Attorney, Agent, or Firm* — Sheridan Ross P.C.

(57) ABSTRACT

A scanner for generating 3D data relating to a surface of a target object includes a scanner frame on which is mounted a set of imaging modules including a light projector unit for projecting a structured light pattern of the surface of the target object, wherein the structured light pattern includes a plurality of elongated light stripes arranged alongside one another, and further defining discrete coded elements extending from at least some of the elongated light stripes in the plurality of elongated light stripes. The set of imaging modules further includes a set of cameras positioned alongside the light projector unit for capturing data conveying a set of images including reflections of the structured light pattern projected onto the surface of the target object, and one or more processor in communication with the set of imaging modules for receiving and processing the data conveying the set of images. Related systems and methods are also described.

33 Claims, 16 Drawing Sheets

(58) Field of Classification Search

CPC .. G01B 11/2518; G01B 5/004; G01B 11/245; G01B 21/045; G01B 11/2509; G01B 11/2531; G01B 11/00; G01B 21/042; G01B 11/24; G01B 5/008; G01B 5/012; G01B 11/022; G01B 11/254; G01B 11/2527; G01B 21/047; G01B 11/03; G01B 11/2504; G01B 11/22; G01B 2210/58; G01B 9/02091; G01B 11/02; G01B 11/14; G01B 9/02089; G01B 11/27; G01B 11/2522; G01B 9/02048; G01B 11/007; G01B 11/303; G01B 11/2536; G01B 11/30; G01B 11/028; G01B 11/2433; G01B 11/2441; G01B 21/04; G01B 2290/20; G01B 9/02001; G01B 9/02004; G01B 9/02007; G01B 9/02034; G01B 9/02044; G01B 9/02064; G01B 11/0608; G01B 11/0691; G01B 11/26; G01B 2210/52; G01B 2210/54; G01B 5/0004; G01B 5/0014; G01B 5/016; G06T 2207/10028; G06T 7/521; G06T 7/73; G06T 17/00; G06T 7/70; G06T 7/593; G06T 2200/04; G06T 7/20; G06T 2207/30204; G06T 19/20; G06T 2207/10048; G06T 7/33; G06T 2207/10024; G06T 7/90; G06T 2207/30036; G06T 1/0007; G06T 2207/20084; G06T 2207/10012; G06T 19/006; G06T 2207/30196; G06T 7/85; G06T 2207/30244; G06T 2219/2012; G06T 7/55; G06T 2210/41; G06T 17/20; G06T 7/246; G06T 7/0012; G06T 7/11; G06T 2207/30004; G06T 7/80; G06T 2207/10016; G06T 17/10; G06T 2207/10004; G06T 2207/10021; G06T 5/80; G06T 7/60; G06T 11/10; G06T 15/00; G06T 2215/16; G06T 3/18; G06T 7/579; G06T 17/30; G06T 2200/08; G06T 7/13; G06T 7/74; G06T 2200/24; G06T 2207/10116; G06T 2207/10152; G06T 2207/30201; G06T 2210/56; G06T 3/40; G06T 7/001; G06T 7/337; G06T 7/62; G06T 15/205; G06T 2207/20081; G06T 2219/2021; G06T 2219/2016; G06T 7/285; G06T 11/00; G06T 2207/30012; G06T 7/30; G06T 7/97; G06T 15/04; G06T 2210/16; G06T 2210/44; G06T 7/50; G06T 17/05; G06T 2207/20221; G06T 2207/30168; G06T 5/50; G06T 7/529; G06T 7/75; G06T 2207/10144; G06T 2211/416; G06T 5/77; G06T 7/0002; G06T 7/0004; G06T 7/194; G06T 7/40; G06T 7/586; G06T 11/60; G06T 15/06; G06T 15/08; G06T 19/00; G06T 2200/32; G06T 2207/10072; G06T 2207/20068; G06T 2207/30208; G06T 3/14; G06T 5/10; G06T 5/70; G06T 5/73; G06T 7/344; G06T 7/38

See application file for complete search history.

(56) References Cited

U.S. PATENT DOCUMENTS

| | | | | |
|---|---|---|---|---|
| 7,487,063 | B2 | 2/2009 | Tubic et al. | |
| 7,768,656 | B2 | 8/2010 | Lapa et al. | |
| 7,912,673 | B2 | 3/2011 | Hebert et al. | |
| 8,284,240 | B2 | 10/2012 | Saint-Pierre et al. | |
| 8,836,766 | B1 | 9/2014 | Hebert | |
| 10,101,154 | B2 * | 10/2018 | Swaminathan | H04N 13/25 |
| 10,271,039 | B2 | 4/2019 | Tubic et al. | |
| 10,643,343 | B2 | 5/2020 | Rochette et al. | |
| 10,812,694 | B2 | 10/2020 | Zhang | |
| 2002/0126267 | A1 * | 9/2002 | Smith | G03F 7/70091 356/399 |
| 2004/0041996 | A1 * | 3/2004 | Abe | G01C 3/08 356/3.01 |
| 2009/0059241 | A1 * | 3/2009 | Lapa | G01B 11/2518 356/603 |
| 2009/0221874 | A1 | 9/2009 | Vinther et al. | |
| 2015/0015701 | A1 | 1/2015 | Yu | |
| 2015/0138349 | A1 * | 5/2015 | Hebert | G01B 11/2513 348/136 |
| 2015/0142378 | A1 | 5/2015 | Hebert et al. | |
| 2017/0054965 | A1 * | 2/2017 | Raab | G01B 11/002 |
| 2017/0180654 | A1 * | 6/2017 | Swaminathan | G01C 3/08 |
| 2019/0154437 | A1 * | 5/2019 | Raz | G06F 3/0304 |
| 2019/0236798 | A1 | 8/2019 | Rochette et al. | |

FOREIGN PATENT DOCUMENTS

| | | | | | |
|---|---|---|---|---|---|
| CA | 2875820 | C | * | 8/2018 | H04N 23/56 |
| CN | 108594453 | B | * | 12/2019 | G02B 27/4205 |
| CN | ZL 202321216387.5 | A1 | | 5/2024 | |
| CN | 118363231 | A | | 7/2024 | |
| CN | 118974512 | A | | 11/2024 | |
| DE | 102016205637 | A1 | * | 10/2016 | G01C 11/06 |
| EP | 2188589 | B1 | | 4/2020 | |
| JP | 2009517634 | A | * | 4/2009 | A61B 5/1077 |
| WO | WO-0137053 | A1 | * | 5/2001 | G03F 7/70125 |
| WO | WO-2007059780 | A1 | * | 5/2007 | G01B 11/2527 |
| WO | WO-2008062407 | A2 | * | 5/2008 | G01B 11/25 |
| WO | WO-2015022384 | A1 | * | 2/2015 | G03B 37/04 |
| WO | WO-2015118467 | A1 | * | 8/2015 | G06T 7/593 |
| WO | 2023220804 | A1 | | 11/2023 | |
| WO | 2024032666 | A1 | | 2/2024 | |
| WO | 2024032668 | A1 | | 2/2024 | |
| WO | 2024032670 | A1 | | 2/2024 | |

OTHER PUBLICATIONS

Examiner's Report issued on Apr. 17, 2025 in connection with the Canadian patent application No. 3,223,018—3 pages.

European Search Report issued on Mar. 12, 2025 in connexion with European Patent Application No. 22941877.7—7 pages.

Real-Time Range Acquisition by Adaptive Structured Light, Thomas P. Koninckx and Luc Van Gool, IEEE Transactions on Pattern Analysis and Machine Intelligence, vol. 28, No. 3, Mar. 2006—pp. 432 to 445.

International Search Report and Written Opinion for International (PCT) Patent Application No. PCT/CA2022/050804, dated Feb. 14, 2023, 8 pages.

Official Communication for China Patent Application No. 202321216387.5, dated Sep. 25, 2023, 1 page.

International Preliminary Report on Patentability (Chapter II) issued on Aug. 30, 2024 in connection with International patent Application No. PCT/CA2022/050804 and annex—44 pages.

First Notification of Rectification issued on Dec. 20, 2023 in connection with Chinese Utility Patent Application No. 202321216387.5 (with English Summary)—4 pages.

* cited by examiner

760

3D SCANNER WITH STRUCTURED LIGHT PATTERN PROJECTOR AND METHOD OF USING SAME FOR PERFORMING LIGHT PATTERN MATCHING AND 3D RECONSTRUCTION

CROSS REFERENCE TO RELATED APPLICATIONS

This application is a national stage application under 35 U.S.C. 371 and claims the benefit of PCT Application No. PCT/CA2022/050804 having an international filing date of 20 May 2022, which designated the United States, the disclosure of which is incorporated herein by reference in its entirety.

TECHNICAL FIELD

The present disclosure generally relates to the field of three-dimensional (3D) metrology, and, more particularly, to 3D scanners using structured light stereovision to reconstruct a surface of an object.

BACKGROUND

Three-dimensional scanning and digitization of the surface geometry of objects is commonly used in many industries. Typically, the surface of an object is scanned and digitized using optical sensors that measure distances between the optical sensor and a set of points on the surface. Triangulation-based sensors generally use at least two different known viewpoints (e.g., typically at least two cameras each oriented in a specific direction) that converge to a same point on the object surface, wherein the two different viewpoints are separated by a specific baseline distance.

When two different viewpoints are used, by knowing the baseline distance and the orientations of the two different viewpoints, a relative position of an observed point can be derived using principles of stereovision (triangulation). An important challenge in stereovision is how to accurately match which pixels of a stereo pair of images (composing a same frame) obtained from the two different viewpoints (e.g., two different cameras) correspond to each other.

An approach for simplifying the matching of the pixels of the stereo pair of images includes the use of a light projector that projects a set of light stripes oriented in known directions onto the surface of the object being scanned. In such a configuration, the surface of the object reflects the projected set of light stripes. The scanner sensors from the two different known viewpoints sense the reflected projected set of light stripes and this results in a stereo pair of images of the surface of the object that includes a reflection of the projected set of light stripes. By leveraging the known orientation and origin of the projected light stripes, in combination with the baseline distance and the orientation of the two different viewpoints, pixels belonging to stripes of the stereo pair of images can be more accurately matched to one another and the corresponding relative position of an observed point can be derived using principles of stereovision (triangulation). By increasing the number of light stripes projected onto the surface of the object being scanned, an increase in the scanning speed can be achieved. An example of such an approach is described in U.S. Pat. No. 10,271,039 issued on Apr. 23, 2019. The contents of this document are incorporated herein by reference.

While the use of light stripes generally improves the process of matching pixels of the stereo pair of images, ambiguities arise where stripes on the object surface can correspond to multiple light stripes in the camera images. Such ambiguities become increasingly problematic as the number of light stripes increases (into the hundreds). As a result, pixels that cannot be matched with a sufficiently high level of confidence must often be discarded, leading to either a reduced scanning speed and/or incorrectly reconstructed 3D surfaces and/or gaps in the reconstructed 3D surface image.

When using multiple light stripes, an approach to resolve ambiguities in the matching of pixels of images obtained for different viewpoints for a same frame is to add one or more additional viewpoints (e.g., cameras) to the system. In other words, using such an approach, the triangulation-based sensors may make use three or more different known viewpoints that converge to a same point on the object surface. An example of such an approach is described in U.S. Pat. No. 10,643,343 issued on May 5, 2020. The contents of this document are incorporated herein by reference. While approaches of this type may improve the accuracy in the matching of pixels by resolving ambiguities in matching and allow a higher number of light stripes to be used (leading to higher scanning speed), adding cameras to a scanner materially increases the cost and weight of the scanner as well as the hardware complexity. In addition, the additional image (or images) may result in a reduction in the frame rate for a given bandwidth, negating at least in part the improvements in scanning speed obtained by the higher number of light stripes.

Another approach for resolving ambiguities in the matching of pixels of images obtained for different viewpoints for a same frame, which may be using separately or in combination with the additions of viewpoints, is to use a light projector that projects sets of light stripes in a crosshair pattern or a grid. The additional stripes provide intersections and results in a network of curves on the surface of the object being scanned. In some cases, the light stripes that are transverse to one another may be projected using different wavelengths providing yet additional information to assist in the matching of pixels. An example of such an approach is described in "Real-Time Range Acquisition by Adaptive Structured Light", by Thomas P. Koninckx et al., IEEE transactions on pattern analysis and machine intelligence, Vol. 28, No. 3, pp. 432-445, March 2006. The contents of this document are incorporated herein by reference. A deficiency of such methods is that, in some cases, pixels extracted near in the intersection of two curves may be less precise. In addition, the use of light sources of different wavelengths attracts additional costs associated with both the light projector and the light sensors (camera).

Against the background described above, it is clear that there remains a need in the industry to provide improved 3D scanners using structured light that alleviate at least some of the deficiencies of conventional handheld 3D scanners.

SUMMARY

This Summary is provided to introduce a selection of concepts in a simplified form that are further described below in the Detailed Description. This Summary is not intended to identify all key aspects and/or essential aspects of the claimed subject matter.

The present disclosure presents methods and systems that match specific continuous segments of light reflections (sometimes referred to as "blobs") observed in a frame capture of a surface of an object to specific corresponding light stripes from a plurality of light stripes in a structured light pattern projected on the surface of the object. More specifically, the methods and systems presented in this instant disclosure make use of a structured light pattern including discrete coded elements extending from light stripes projected by a light projector unit of a 3D scanner. Advantageously, the use of discrete coded elements may assist in reducing the number of plausible combinations needed to resolve ambiguities in the matching of pixels of images obtained for different viewpoints for a same frame. The discrete coded elements accelerate the matching of the specific continuous segments to the specific corresponding projected stripes, which may allow accelerating the fluidity of the scan (e.g., faster scan speed, and less frame drop) and may reduce false matches and/or outliers on the measured scanned surface. The use of the discrete coded elements may also reduce the need for a third camera to resolve ambiguities, allowing for a less costly cost two-camera system without compromising comprising accuracy.

According to one broad aspect of the disclosure, a scanner for generating 3D data relating to a surface of a target object, the scanner including a scanner frame on which is mounted a set of imaging modules including a light projector unit for projecting a structured light pattern of the surface of the target object, wherein the structured light pattern includes a plurality of elongated light stripes arranged alongside one another, the structured light pattern further defining discrete coded elements extending from at least some of the elongated light stripes in the plurality of elongated light stripes, a set of cameras positioned alongside the light projector unit for capturing data conveying a set of images including reflections of the structured light pattern projected onto the surface of the target object, and one or more processor in communication with the set of imaging modules for receiving and processing the data conveying the set of images.

Specific practical implementations may include one or more of the following features: the set of imaging modules may be mounted to the scanner frame in an arrangement defining a plurality of epipolar planes, and the elongated light stripes in the plurality of elongated light stripes may extend transversely to the plurality of epipolar planes. The set of imaging modules may be mounted to the scanner frame in an arrangement defining a plurality of epipolar planes, and the elongated light stripes in the plurality of elongated light stripes extend orthogonally to the plurality of epipolar planes. The light projector unit may include a light source and a pattern generator. The light projector unit may include a diffractive optics-based laser projector. The light projector unit may include a digital micromirror device or liquid crystal display projector. The pattern generator may include an optical element having translucent portions and opaque portions, the translucent portions and the opaque portions being arranged to shape light emitted by the light source into the structured light pattern. The optical element may include a glass layer, the translucent portions and opaque portions being defined upon the glass layer. The opaque portions of the optical element may include a layer of material disposed on the glass layer, the layer of material being substantially opaque to the light source of the light projector unit. The layer of material may include metallic particles. The metallic particles may include chromium particles. The layer of material may include a film. The translucent portions may be free from the layer of material that is substantially opaque to the light source of the light projector unit. The light source may be configured to emit at least one of a visible monochrome light, white light and near-infrared light. At least one camera in the set of cameras may be selected from the set consisting of visible color spectrum cameras, near infrared cameras and infrared cameras. The light source may be an infrared light source or near-infrared light source. At least one camera in the set of cameras may be a monochrome, visible color spectrum, or near infrared camera. The set of cameras may include at least two monochrome, visible color spectrum, or near infrared cameras. The light source may be configured to emit light having wavelengths between 405 nm and 1100 nm. The light source may include at least one of a light emitting diode (LED) and a laser. The light source may include a laser. The laser may include at least one of a VCSEL, a solid-state laser, and a semiconductor laser. The discrete coded elements may include a single type of discrete coded elements. Alternatively, the discrete coded elements may include a plurality of different types of discrete coded elements, wherein different types of discrete coded elements in the plurality of different types of discrete coded elements present different specific shapes when extending from the at least some of the elongated light stripes. The plurality of different types of discrete coded elements may include at least two different types of discrete coded elements. The plurality of different types of discrete coded elements may include at least three different types of discrete coded elements. The plurality of different types of discrete coded elements may include at least four different types of discrete coded elements.

In some embodiments, a first specific elongated light stripe of the at least some of the elongated light stripes may include a first set of discrete coded elements, each of the discrete coded elements of the first set being of a first type, and a second specific elongated light stripe of the at least some of the elongated light stripes includes a second set of discrete coded elements, each of the discrete coded elements of the second set being of a second type, wherein the first specific elongated light stripe is distinct from the second specific elongated light stripe. A first specific elongated light stripe of the at least some of the elongated light stripes may include a first set of discrete coded elements, at least some of the discrete coded elements of the first set being of different types and being arranged in accordance with a first coding pattern, and a second specific elongated light stripe of the at least some of the elongated light stripes includes a second set of discrete coded elements, at least some of the discrete coded elements of the second set being of different types and being arranged in accordance with a second coding pattern distinct from the first coding pattern. Specific elongated light stripes of the at least some of the elongated light stripes may include respective sets of discrete coded elements, at least some of the discrete coded elements each set being of different types, the discrete coded elements of each set being arranged in accordance with a specific one of at least two distinct coding patterns. The first set of discrete coded elements may include at least two discrete coded elements, the second set of discrete coded elements includes at least two discrete coded elements. Discrete coded elements located on an intersecting line extending transversely to the plurality of elongated light stripes may include discrete coded elements of different types. Discrete coded elements located on an intersecting line extending orthogonally to the plurality of elongated light stripes may include discrete coded elements of different types. Each discrete coded element located on the intersecting line may be of a specific type different from that of other discrete coded element located on the intersecting line. The intersecting line may coincide with a specific epipolar plane in the plurality of epipolar planes. At least some of the discrete coded elements may include coded components extending generally orthogonally from elongated light stripes in the plurality of elongated light stripes. Discrete coded elements extending from a same specific elongated light stripe in the plurality of elongated light stripes may be spaced apart from each other. The structured light pattern may define discrete coded elements extending from each of the elongated light stripes in the plurality of elongated light stripes. The plurality of elongated light stripes in the structured light pattern may be comprised of non-intersecting elongated light stripes. The non-intersecting elongated light stripes comprised in the plurality of elongated light stripes may be substantially parallel to one another.

In some embodiments, the set of cameras may include a first camera and a second camera, wherein the second camera is mounted to have a field of view at least partially overlapping with a field of view of the first camera. The first camera and a second camera may be spaced from one another and oriented such as to define a baseline for the plurality of epipolar planes for use in generating the 3D data relating to the surface of the target object. The set of imaging modules may comprise a third camera. The third camera may be a color camera. The third camera may alternatively be a monochrome, visible color spectrum, or near infrared camera and the set of imaging modules may comprise a fourth camera. The fourth camera may be a color camera. The set of cameras may alternatively include a single camera. The one or more processors may be configured for processing the set of images including the reflections of the structured light pattern to perform a 3D reconstruction process of the surface of the target object, the 3D reconstruction process being performed at least in part using the discrete coded elements extending from at least some of the light stripes in the plurality of light stripes. The one or more processors may alternatively be configured for transmitting the data conveying the set of images including the reflections of the structured light pattern to a remote computing system distinct from the scanner, the remote computing system being configured for performing a 3D reconstruction process of the surface of the target object using the data conveying the set of images including the reflections of the structured light pattern, the 3D reconstruction process being performed at least in part using the discrete coded elements extending from at least some of the light stripes in the plurality of light stripes. The 3D reconstruction process may include using the plurality of light stripes and the discrete coded elements positioned at least some of the light stripes to determine measurements relating to the surface of the object using a triangulation process based on a correspondence between reflections of the structured light pattern and pixels in the sets of images. In some specific practical implementations, the scanner may be a handheld scanner.

According to another aspect, a scanning system is provided for generating 3D data relating to a surface of a target object. The scanning system including a scanner of the type described above and a computing system in communication with the scanner, the computing system being configured for performing a 3D reconstruction process of the surface of the target object using the data conveying the set of images including the reflections of the structured light pattern captured by the scanner, the 3D reconstruction process being performed at least in part using the discrete coded elements extending from at least some of the light stripes in the plurality of light stripes.

According to another aspect of the disclosure, a scanning system is provided for generating 3D data relating to a surface of a target object. The scanning system includes: a scanner having a scanner frame on which is mounted a set of imaging modules including a light projector unit for projecting a structured light pattern of the surface of the target object, wherein the structured light pattern includes a plurality of elongated light stripes arranged alongside one another, the structured light pattern further defining discrete coded elements extending from at least some of the elongated light stripes in the plurality of elongated light stripes; a set of cameras positioned alongside the light projector unit for capturing data conveying a set of images including reflections of the structured light pattern projected onto the surface of the target object; a communication module in communication with the set of imaging modules, said communication module being configured for transmitting the data conveying the set of images to external devices for processing; and a computing system in communication with said scanner, the computing system being configured for (i) receiving the data conveying the set of images including the reflections of the structured light pattern, and (ii) processing said data to perform a 3D reconstruction process of the surface of the target object, the 3D reconstruction process being performed at least in part by using the discrete coded elements extending from at least some of the light stripes in the plurality of light stripes.

Specific practical implementations may include one or more of the following features: the 3D reconstruction process may include using the plurality of light stripes and the discrete coded elements positioned at least some of the light stripes to determine measurements relating to the surface of the object using a triangulation process based on a correspondence between points in the structured light pattern and the sets of images. The set of imaging modules may be mounted to the scanner frame in an arrangement defining a plurality of epipolar planes, and the elongated light stripes in the plurality of elongated light stripes extend transversely to the plurality of epipolar planes. The set of imaging modules may be mounted to the scanner frame in an arrangement defining a plurality of epipolar planes, and the elongated light stripes in the plurality of elongated light stripes extend orthogonally to the plurality of epipolar planes.

According to another aspect of the disclosure, a light projector unit is provided for projecting a structured light pattern on a surface of an object, the light projector unit being configured for use in a 3D scanner having a set of cameras for capturing data conveying a set of images including reflections of the structured light pattern projected onto the surface of the target object, wherein the structured light pattern includes a plurality of elongated light stripes arranged alongside one another, the structured light pattern further defining discrete coded elements extending from at least some of the elongated light stripes in the plurality of elongated light stripes.

Specific practical implementations may include one or more of the following features: the light projector unit may include a diffractive optics-based laser projector. The light projector unit may include a digital micromirror device or liquid crystal display projector. Cameras in the set of cameras may be mounted to the scanner frame in an arrangement defining a plurality of epipolar planes, and the elongated light stripes in the plurality of elongated light stripes may be configured to extend transversely to the plurality of epipolar planes when the light projector unit is mounted to the 3D scanner. The light projector unit may include a light source and a pattern generator. The pattern generator may include an optical element having translucent portions and opaque portions, the translucent portions and the opaque portions being arranged to shape light emitted by the light source into the structured light pattern. The optical element may include a glass layer, the translucent portions and opaque portions being defined upon the glass layer. The opaque portions of the optical element include a layer of material disposed on the glass layer, the layer of material being substantially opaque to the light source of the light projector unit. The layer of material may include metallic particles. The metallic particles may include chromium particles. The layer of material may include a film. The translucent portions may be free from the layer of material that is substantially opaque to the light source. The light source may be configured to emit at least one of a white light, visible color light, and infrared light. In some specific practical implementations, the light source may be an infrared light source. The light source may be configured to emit light having wavelengths between 405 nm and 940 nm. The light source may include at least one of a light emitting diode (LED) and a laser. The light source may include a laser. The laser may include at least one of a VCSEL, a solid-state laser, and a semiconductor laser. The discrete coded elements may include a plurality of different types of discrete coded elements, wherein different types of discrete coded elements in the plurality of different types of discrete coded elements present different specific shapes when extending from the at least some of the elongated light stripes. The plurality of different types of discrete coded elements may include at least two different types of discrete coded elements. The plurality of different types of discrete coded elements may include at least three different types of discrete coded elements.

In some embodiments, a first specific elongated light stripe of the at least some of the elongated light stripes may include a first set of discrete coded elements, each of the discrete coded elements of the first set being of a first type, and a second specific elongated light stripe of the at least some of the elongated light stripes may include a second set of discrete coded elements, each of the discrete coded elements of the second set being of a second type, wherein the first specific elongated light stripe is distinct from the second specific elongated light stripe. A first specific elongated light stripe of the at least some of the elongated light stripes may include a first set of discrete coded elements, at least some of the discrete coded elements of the first set being of different types and being arranged in accordance with a first coding pattern, and a second specific elongated light stripe of the at least some of the elongated light stripes may include a second set of discrete coded elements, at least some of the discrete coded elements of the second set being of different types and being arranged in accordance with a second coding pattern distinct form the first coding pattern. Specific elongated light stripes of the at least some of the elongated light stripes may include respective sets of discrete coded elements, at least some of the discrete coded elements each set being of different types, the discrete coded elements of each set being arranged in accordance with a specific one of at least two distinct coding patterns. Discrete coded elements located on an intersecting line extending transversely to the plurality of elongated light stripes may include discrete coded elements of different types. Discrete coded elements located on an intersecting line extending orthogonally to the plurality of elongated light stripes may include discrete coded elements of different types. Each discrete coded element located on the intersecting line may be of a specific type different from that of other discrete coded elements located on the intersecting line. At least some of the discrete coded elements may include coded components extending generally orthogonally from elongated light stripes in the plurality of elongated light stripes. Discrete coded elements extending from a same specific elongated light stripe in the plurality of elongated light stripes may be spaced apart from each other. The structured light pattern may define discrete coded elements extending from each of the elongated light stripes in the plurality of elongated light stripes. The plurality of elongated light stripes in the structured light pattern may be comprised of non-intersecting elongated light stripes. The non-intersecting elongated light stripes comprised in the plurality of elongated light stripes may be substantially parallel to one another.

According to another aspect of the disclosure, a computer-implemented method is provided for generating 3D data relating to a surface of a target object. The method comprises: a. receiving data captured by a set of imaging modules of a 3D scanner, the data conveying a set of images including reflections of a structured light pattern projected onto the surface of the target object, the projected structured light pattern including a plurality of projected elongated light stripes arranged alongside one another, the projected structured light pattern further defining projected discrete coded elements extending from at least some of the projected elongated light stripes in the plurality of projected elongated light stripes; b. processing the set of images to derive mappings between specific image portions and specific projected elongated light stripes of the projected structured light pattern, wherein the specific image portions correspond to reflections of the specific projected elongated stripes and to reflections of corresponding specific projected discrete coded elements of the projected structured light pattern, and wherein the mappings are derived at least in part by processing the reflections of the specific discrete coded elements in the specific image portions; and c. processing the set of images and the derived mappings between the specific image portions and the specific projected elongated light stripes to resolve measurements related to the surface of a target object and derive at least a portion of the 3D data related to a reconstructed surface for the target object.

Specific practical implementations may include one or more of the following features: the light projected elongated light stripes in the plurality of projected elongated light stripes may extend transversely to a plurality of epipolar planes defined by the set of imaging modules of the 3D scanner. The method may comprise: (a) processing the set of images to derive mappings between specific image portions and specific projected elongated light stripes includes processing the set of images to extract the specific image portions at least in part by identifying areas of the images corresponding to continuous segments of the reflections of the structured light pattern; and (b) processing the extracted specific image portions to identify sub-areas corresponding to the reflections of the specific discrete coded elements. In some implementations, processing the set of images to derive mappings between specific image portions and specific projected elongated light stripes may include processing the reflections of the discrete coded elements in the set of images to resolve at least some ambiguities between at least some of the plurality of projected elongated light stripes and specific image portions. In some implementations, processing the set of images to derive mappings between specific image portions and specific projected elongated light stripes may include labelling the specific image portions with respective identifiers. In some implementations, processing the set of images and the derived mappings to resolve measurements related to the surface of a target object may include using a triangulation-based process. In some implementations, the structured light pattern projected onto the surface of the target object may be created by at least one of a white light source, a visible color light source, and an infrared light source. In some very specific practical implementations, the structured light pattern projected onto the surface of the target object may be created by an infrared light source. In some implementations, the discrete coded elements may include a plurality of different types of discrete coded elements, and the mappings may be derived at least in part by processing the reflections of the specific discrete coded elements in the specific image portions to derive corresponding specific types of discrete coded elements. Different types of discrete coded elements in the plurality of different types of discrete coded elements may present different specific shapes when extending from the at least some of the projected elongated light stripes. The plurality of different types of discrete coded elements may include at least two different types of discrete coded elements, at least three different types of discrete coded elements, at least four different types of discrete coded elements or even more.

In some embodiments, a first specific elongated light stripe of the at least some of the projected elongated light stripes may include a first set of discrete coded elements, each of the discrete coded elements of the first set being of a first type, and a second specific elongated light stripe of the at least some of the projected elongated light stripes includes a second set of discrete coded elements, each of the discrete coded elements of the second set being of a second type, wherein the first specific elongated light stripe is distinct from the second specific elongated light stripe. In alternative implementations, a first specific elongated light stripe of the at least some of the projected elongated light stripes may include a first set of discrete coded elements, at least some of the discrete coded elements of the first set being of different types and being arranged in accordance with a first coding pattern, and a second specific elongated light stripe of the at least some of the projected elongated light stripes includes a second set of discrete coded elements, at least some of the discrete coded elements of the second set being of different types and being arranged in accordance with a second coding pattern distinct form the first coding pattern. In alternative implementations, specific projected elongated light stripes of the at least some of the projected elongated light stripes may include respective sets of discrete coded elements, at least some of the discrete coded elements each set being of different types, the discrete coded elements of each set being arranged in accordance with a specific one of at least two distinct coding patterns. For example, the first set of discrete coded elements may include at least two discrete coded elements and the second set of discrete coded elements may include at least two discrete coded elements. In some specific implementations, discrete coded elements located on an intersecting line extending transversely to, and in some cases orthogonally to, the plurality of projected elongated light stripes may include discrete coded elements of different types. In some very specific implementation, each discrete coded element located on the intersecting line may be of a specific type different from that of other discrete coded element located on the intersecting line however a limited number of repetitions of a same type of discrete coded element on the intersecting line may be permitted in some alternative practical implementations. The intersecting line may coincide with a specific epipolar plane in the plurality of epipolar planes. At least some of the discrete coded elements may include coded components that extend generally orthogonally from projected elongated light stripes in the plurality of projected elongated light stripes. In some practical implementations, discrete coded elements extending from a same specific elongated light stripe in the plurality of projected elongated light stripes may be spaced apart from each other. In some practical implementations, the structured light pattern may define discrete coded elements extending from a subset of the projected elongated light stripes or, alternatively, from each of the projected elongated light stripes in the plurality of projected elongated light stripes. The plurality of projected elongated light stripes in the structured light pattern may be comprised of non-intersecting projected elongated light stripes and, in some specific implementations, the non-intersecting projected elongated light stripes may be substantially parallel to one another.

According to another aspect of the disclosure, a computer-implemented method is provided for the 3D measurement of a surface of an object. The computer-implemented method includes: (i) receiving at least one image acquired by a sensor that includes reflections of a structured light pattern projected from a light projector onto the surface of the object, wherein the structured light pattern includes a plurality of elongated light stripes having discrete coded elements; (ii) extracting a specific image portion at least in part by identifying areas of the image corresponding to continuous segments of the reflections of the structured light pattern; (iii) associating the specific image portion with at least one of the discrete coded elements; and (iv) determining a measurement relating to the surface of the object based on a correspondence between the specific image portion and the at least one of the discrete coded elements.

Specific practical implementations may include one or more of the following features: the elongated light stripes in the plurality of elongated light stripes may extend transversely to a plurality of epipolar planes defined by the sensor. In some implementations, the method may comprise labelling the specific image portion with a unique identifier. In some implementations, the method may comprise (i) selecting a specific epipolar plane from of the plurality of epipolar planes defined by the sensor; and (ii) identifying plausible combinations on the epipolar plane, the plausible combinations including a light stripe label of the light stripes of the structured light pattern and the unique identifier for a plausible continuous segments of the reflections selected from the continuous segments of the reflections in the at least one image. The method may also comprise identifying plausible combinations by proximity to the associated at least one continuous segment of the reflections and at least one of the discrete coded elements. The method may also comprise calculating a matching error for each of the plausible combinations and determining a most probable combination by computing a figure of merit for each of the plausible combinations using the matching error to find a most probable match. The method may also comprise validating matching points to discard matching points if the figure of merit fails to meet a quality of match threshold. In some implementations, the method may also comprise associating each continuous segment of the reflections with the most probable match and calculating a set of 3D points using the matching points. The method may also comprise determining a measurement relating to the surface of the object includes using a triangulation algorithm.

According to another aspect of the disclosure, a computer program product is provided including program instructions tangibly stored on one or more tangible computer readable storage media, the instructions of the computer program product, when executed by one or more processors, cause a system to generating 3D data relating to a surface of a target object, the operations implementing a computer-implemented method described above.

According to another aspect of the disclosure, an apparatus is provided for generating 3D data relating to a surface of a target object. The apparatus comprises (i) an input for receiving data captured by a set of imaging modules of a 3D scanner, the data conveying a set of images including reflections of a structured light pattern projected onto the surface of the target object, the projected structured light pattern including a plurality of projected elongated light stripes arranged alongside one another, the projected structured light pattern further defining projected discrete coded elements extending from at least some of the projected elongated light stripes in the plurality of projected elongated light stripes; (ii) a processing module in communication with said input, said processing module being configured for (1) processing the set of images to derive mappings between specific image portions and specific projected elongated light stripes of the projected structured light pattern, wherein the specific image portions correspond to reflections of the specific projected elongated stripes and to reflections of corresponding specific projected discrete coded elements of the projected structured light pattern, and wherein the mappings are derived at least in part by processing the reflections of the specific discrete coded elements in the specific image portions; and (2) processing the set of images and the derived mappings between the specific image portions and the specific projected elongated light stripes to resolve measurements related to the surface of a target object and derive at least a portion of the 3D data related to a reconstructed surface for the target object; and (iii) a display device in communication with said processing module for generating a graphical representation of the reconstructed surface for the target object.

In various practical implementations of the scanners of the types described above, the scanner may be equipped with the suitable hardware and software components, including one or more processors in communication with the set of imaging modules (including the cameras and the light projector unit), for receiving and processing data generated by the set of imaging modules. The one or more processors may be operationally coupled to the set of imaging modules as well as to user controls, which may be positioned on the scanner or remotely therefrom. The scanner may be further equipped with suitable hardware and/or software components for allowing the scanner to exchange data and control signals with external components for the purpose of controlling the scanner and/or manipulating the data collected by the scanner.

All features of exemplary embodiments which are described in this disclosure and are not mutually exclusive can be combined with one another. Elements of one embodiment or aspect can be utilized in the other embodiments/aspects without further mention. Other aspects and features of the present invention will become apparent to those ordinarily skilled in the art upon review of the following description of specific embodiments in conjunction with the accompanying Figures.

BRIEF DESCRIPTION OF THE DRAWINGS

The above-mentioned features and objects of the present disclosure will become more apparent with reference to the following description taken in conjunction with the accompanying drawings, wherein like reference numerals denote like elements and in which.

Figure 1A:
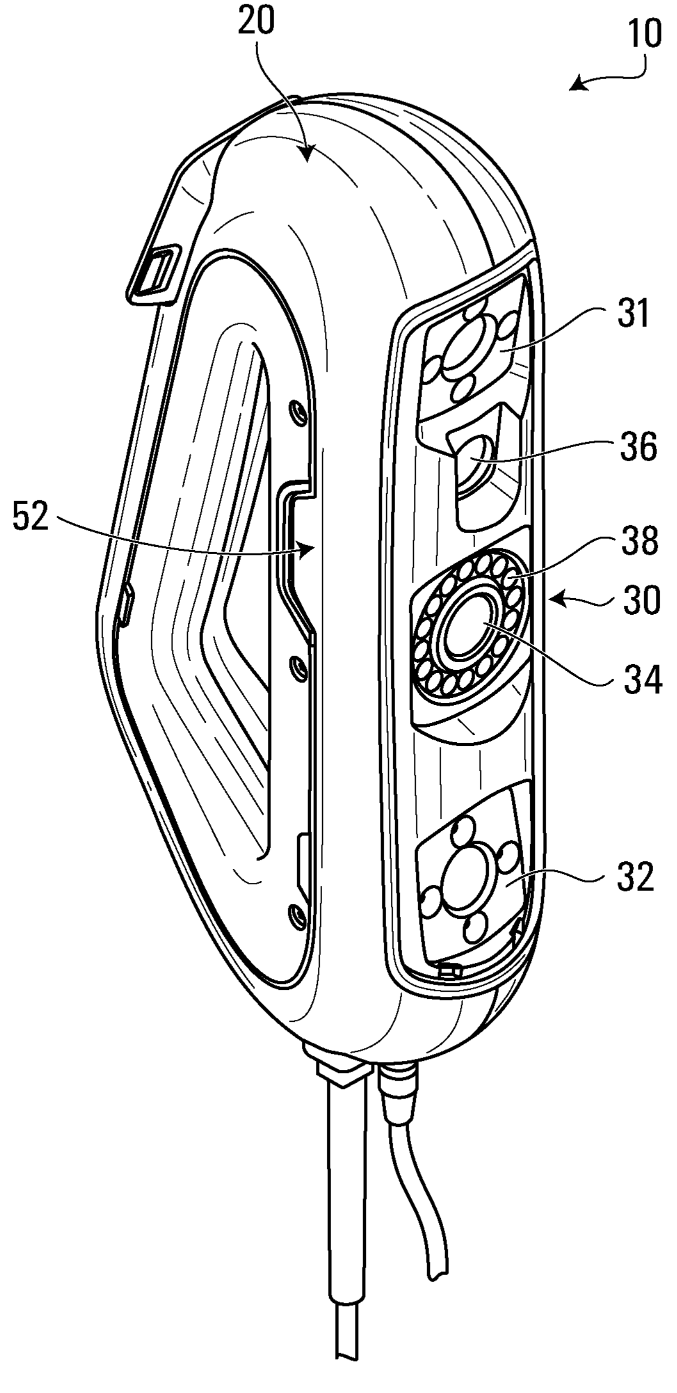
FIG. 1A is a perspective view of a scanner for generating 3D data relating to a surface of a target object in accordance with a specific embodiment.

In the drawings, exemplary embodiments are illustrated by way of example. It is to be expressly understood that the description and drawings are only for the purpose of illustrating certain embodiments and are an aid for understanding. They are not intended to be a definition of the limits of the invention.

DETAILED DESCRIPTION OF EMBODIMENTS

A detailed description of one or more specific embodiments of the invention is provided below along with accompanying Figures that illustrate principles of the invention. The invention is described in connection with such embodiments, but the invention is not limited to any specific embodiment described. The scope of the invention is limited only by the claims. Numerous specific details are set forth in the following description in order to provide a thorough understanding of the invention. These details are provided for the purpose of describing non-limiting examples and the invention may be practiced according to the claims without some or all of these specific details. For the purpose of clarity, technical material that is known in the technical fields related to the invention has not been described in great detail so that the invention is not unnecessarily obscured.

The present disclosure presents methods and systems that match specific continuous segments of light reflections (or "blobs") observed in a frame capture of a surface of an object to specific corresponding light stripes from a plurality of light stripes in a structured light pattern projected on the surface of the object. With increasing numbers of projected light stripes (e.g., in the hundreds) an increased number of ambiguities are introduced when trying to match possible continuous segment-light stripe combinations, ambiguities that will be discarded if they cannot be resolved. The use of a structured light pattern including discrete coded elements extending from the projected light stripes may reduce the number of plausible combinations needed to resolve the ambiguities. In particular, the discrete coded elements may accelerate the matching of the continuous segments to projected stripes, accelerating the fluidity of the scan (e.g., faster scan speed, and less frame drop) and reducing bad matches or outliers on the measured scanned surface. Use of the discrete coded elements removes the need for a third camera to resolve ambiguities, allowing for a less costly cost two-camera system without compromising comprising accuracy.

Definitions

Herein, "light stripes" refers to projected lines of light emitted by a projector and forming a pattern on an object's surface or scene.

Herein, light "blobs" refer to continuous segments of light on the images reflected from a surface of an object. As the projected light stripes can be partially or wholly obfuscated and/or deformed depending on the shape of the object's surface, the cameras will detect these continuous segments of light (blobs) rather than elongated lines. Moreover, segments of light (blobs) that correspond to same light strip of the structured light pattern may or may not be connected to each other and thus more than one segment of light (blob) may be matched to a same light stripe from the plurality of light stripes projected by the projector.

Herein, "ambiguities" refers to multiple possible matches between a continuous segment of light and multiple candidate light stripes in the structured light pattern. Ambiguities may arise for example if the light stripes in the structured light pattern are similar in position relative to the position of the continuous segment of light in an epipolar plane.

3D Measurements of a Surface

Figure 1B:
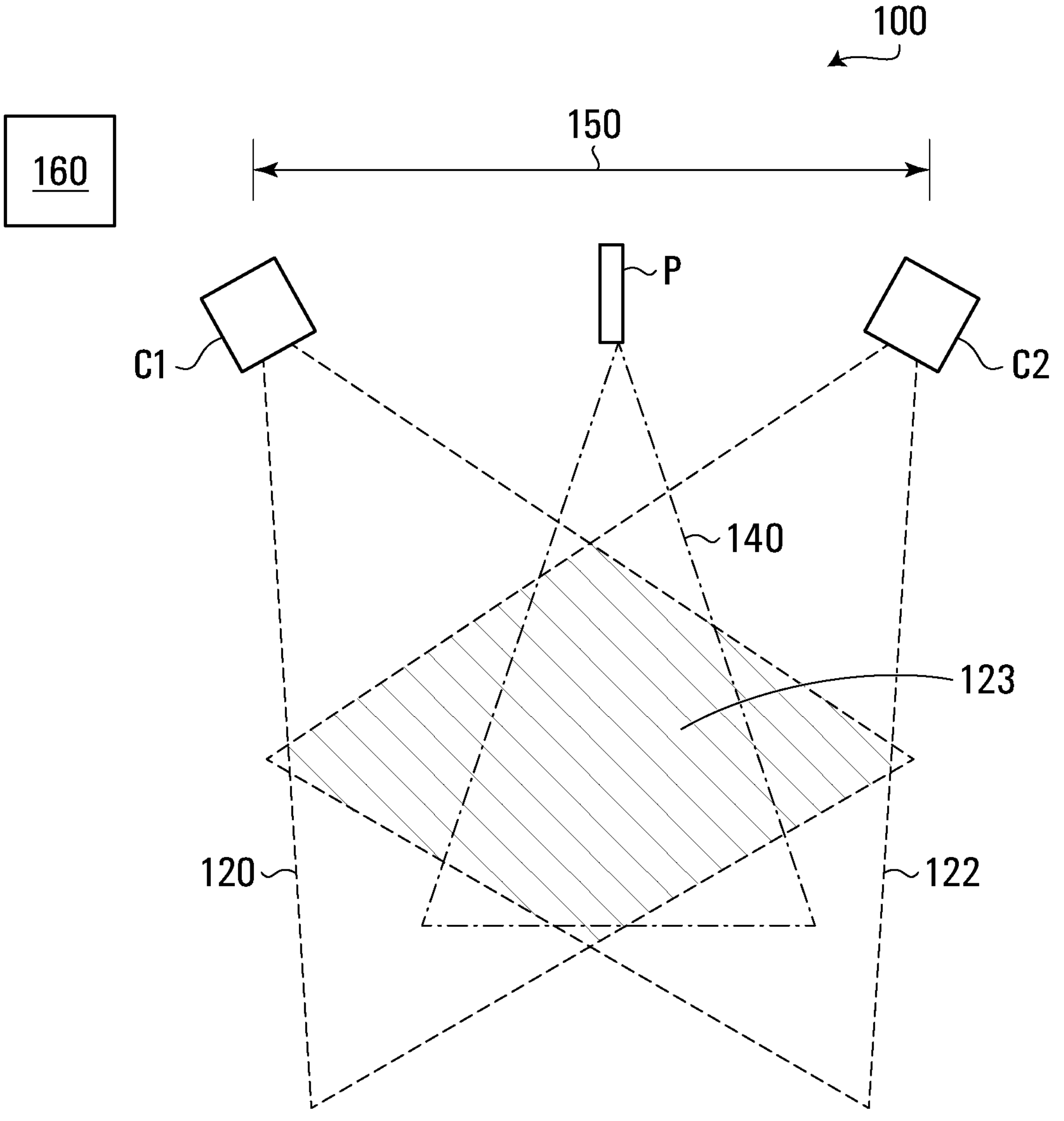
FIG. 1B is a block diagram illustrating a system configuration of the scanner of FIG. 1A.

FIG. 1A shows an embodiment of a 3D scanner implemented as a handheld 3D scanner 10 and FIG. 1B illustrates the function of some of the components of such a 3D scanner in accordance with a specific implementation. In the embodiment depicted, the scanner 10 includes a set of imaging modules 30 that are mounted to a main member 62 of a frame structure 20 of the scanner 10. The set of imaging modules 30 may be arranged alongside one another so that the fields of view of each of the imaging modules at least partially overlap. In the embodiment shown, the set of imaging modules 30 comprises three cameras, namely a first camera 31 (equivalent to camera C1 in FIG. 1B), a second camera 32 (equivalent to camera C2 in FIG. 1B) as well as a third camera 34. The set of imaging modules 30 also includes a light projector unit 36 comprising a light source and a pattern generator (equivalent to light projector unit P in FIG. 1B). In some other embodiments, the light projector unit 36 may include a single light source, e.g., a light source emitting one of an infrared light, a white light, a blue light or other visible monochrome light. In some other embodiments, the light projector unit P is configured to emit light having wavelengths between 405 nm and 1100 nm. In some other embodiments, the light projector unit 36 may include two different light sources, e.g., a first light source emitting infrared light and second light source emitting white light. The two different light sources may be part of the same light projector unit 36 or can be embodied as separate units (e.g., in an additional light projector unit). In some embodiments, the set of imaging modules 30 may include a second light projector unit (not shown in the Figures) positioning on the main member 52 of a frame structure 20 of the scanner 10. In some embodiments, the light projector unit 36 is a diffractive optics-based laser projector, or an image projector such as a digital micromirror device or liquid crystal display projector.

In some specific practical implementations, the light source of the light projector unit 36 may include one or more LEDs 38 configured to all emit the same type of light or configured to emit different types of light (e.g., IR and/or white light and/or blue light).

The type of cameras used for the first and second cameras 31, 32 are typically monochrome cameras and will depend on the type of the light source(s) used in the light projector unit 36. In some embodiments, the first and second cameras 31, 32 may be monochrome, visible color spectrum, or near infrared cameras and the light projector unit 36 is an infrared light projector or near-infrared light projector. The cameras 31, 32 may implement any suitable shutter technology, including but not limited to: rolling shutters, global shutters, mechanical shutters and optical liquid crystal display (LCD) shutters and the like. In some implementations, the third camera 34 may be a color camera (also called a texture camera). The texture camera may implement any suitable shutter technology, including but not limited to, rolling shutters, global shutters, mechanical shutters and optical liquid crystal display (LCD) shutters and the like. In other implementations, the third camera 34 may be of similar configuration to the first and second cameras 31, 32 and used to improve matching confidence and speed. In such embodiments, a fourth camera may be included, so that the scanner includes three near infrared cameras and a color camera (in one example configuration). In further embodiments, a single camera can be used, and the second (and third and/or fourth) camera omitted.

As depicted in FIG. 1A, the first camera 31 may be positioned on the main member 52 of the frame structure 20 alongside the light projector unit 36. The first camera 31 is generally oriented in a first camera direction and configured to have a first camera field of view (120 in FIG. 1B) at least partially overlapping with the field of projection 140 (of FIG. 1B) of the light projector unit 36. The second camera 32 is also positioned on the main member 52 of the frame structure 20 and may be spaced from the first camera 31 (by baseline distance 150) and from the light projector unit 36. The second camera 32 is oriented in a second camera direction and is configured to have a second camera field of view (122 in FIG. 1B) at least partially overlapping with the field of projection of the light projector unit 36 and at least partially overlapping with the first field of view 120. The overlap 123 of the fields of view is depicted in FIG. 1B.

The texture camera 34 is also positioned on the main member 52 of the frame structure 20 and, as depicted, may be positioned alongside the first camera 31, the second camera 32 and the light projector unit 36. The texture camera 34 is oriented in a third camera direction and is configured to have a third camera field of view at least partially overlapping with the field of projection, with the first field of view, and with the second field of view.

A data connection (such as a USB connection) between the scanner 10 and one or more computer processors (shown in FIG. 1B) can allow for the transfer of data collected by the first camera 31, the second camera 32 and the third camera 34 so that it may be processed to derived 3D measurements of the surface being scanned. The one or more computer processors 160 may be embodied in a remote computing system or, alternatively, may be part of the scanner 10 itself.

FIG. 1B is a functional block diagram showing components of a set of imaging modules 100 of the scanner 10. As depicted, set of imaging modules 100 may include a light projector unit P and two cameras, wherein the light projector unit P is mounted between the two cameras C1, C2, which in turn are separated by a baseline distance 150. Each camera C1, C2 has a respective field of view 120, 122. The light projector unit P projects a pattern within a respective span 140. In FIG. 1B, the light projector unit P includes a single light projector, although embodiments having two or more light projector units can also be contemplated. The light projector unit P may be configured to project visible or non-visible light, coherent or non-coherent light. In practical implementations, the light projector unit P may include one or more light sources comprised of a laser (such as a vertical-cavity surface-emitting laser or VCSEL, a solid-state laser, and a semiconductor laser) and/or one or more LEDs, for example.

The light projector unit P may be configured to project a structured light pattern comprised of a plurality of sheets of light that are arranged alongside one another. The sheets of light may appear as elongated light stripes when projected onto a surface of an object. The elongated light stripes are non-intersecting elongated light stripes and, in some implementations, may be substantially parallel to each other. In some embodiments, the light projector unit P can be a programmable light projector unit that can project more than one pattern of light. For example, the light projector unit P can be configured to project different structured line pattern configurations. In some embodiments, the light projector unit P can emit light having wavelengths between 405 nm and 1100 nm.

The cameras C1, C2 and the light projector unit P are calibrated in a common coordinate system using methods known in the art. In some practical implementations, films performing bandpass filter functions may be affixed on the camera lenses to match the wavelength(s) of the projector P. Such films performing bandpass filter functions may help reduce interferences from ambient light and other sources.

Using the set of imaging modules 100 with at least one computer processor 160 (shown in 1B), measurements of 3D points can be obtained after applying a triangulation-based computer-implemented method. In a typical process, two images of a frame are captured using the two cameras C1, C2. The two images are captured simultaneously, with either no relative displacement (or negligible relative displacement) between the object being scanned (or sense) and the set of imaging modules 100 occurring during the acquisition of the images. The cameras C1 and C2 may be synchronized to either capture the images at the same time or sequentially during a period of time in which the relative position of the set of imaging modules 100 with respect to the scene remains the same or varies within a predetermined negligible range. Both of these cases are considered to be a simultaneous capture of the images by the set of imaging modules 100.

Once the two images of a frame have been captured by C1 and C2, image processing may be applied to the images to derived 3D measurements of the surface of the object being scanned. The two images generated from the two respective viewpoints of the cameras C1, C2 contain reflection of the structured light pattern projected by the light projector unit P onto the object being scanned (the scene). The reflected structured light pattern may appear as a set of continuous segments of light reflection (sometimes referred to as “blobs”) in each image rather than as continuous light stripes. These segments(blobs) in the images appear lighter than the background and can be segmented using any suitable approach known in the art techniques, such as thresholding the image signal and applying segmentation validation. To reduce an impact of noise in the image, a minimum length of a segment(blob) may be set to a predetermined number of pixels, such as 2 pixels, for example. The pixels that are part of the same continuous segments of light reflection may be indexed with a label.

Figure 2:
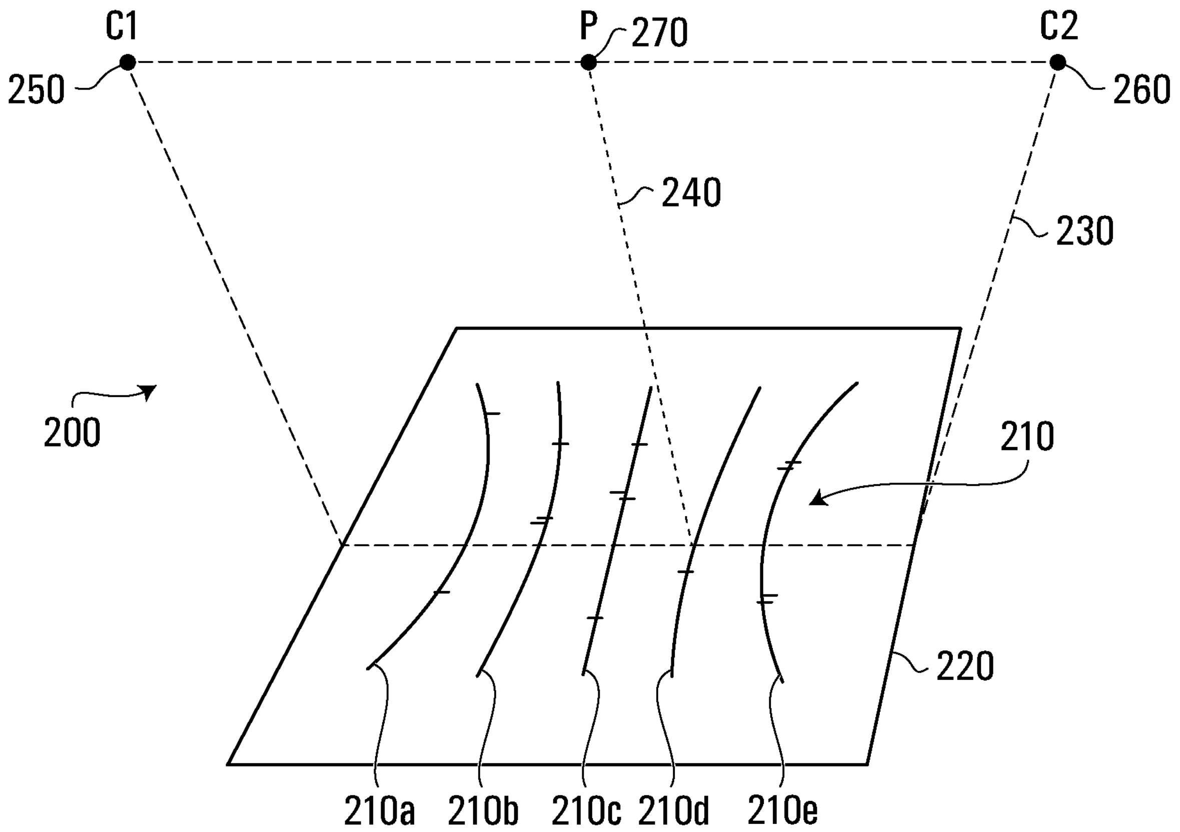
FIG. 2 is a representation of an epipolar plane overlaid on a scene in accordance with a specific embodiment.

Once continuous segments of light reflections have been identified in the two images of a frame captured by cameras C1 and C2, an epipolar plane may be selected in the next processing step. FIG. 2 is an illustration 200 showing an example epipolar plane 230 overlaid on an image 220. As depicted, the epipolar plane shares a common line segment between the centers of projection 250 and 260 corresponding to the two cameras C1 and C2. The line segment C1-C2 acts as a rotational axis for defining multiple epipolar planes. Thus, a set of epipolar planes can be indexed using a parameter angle relative to the line segment C1-C2 or, equivalently, using a pixel coordinate in one of the images captures by C1 and C2. A specific epipolar plane intersects the two image planes and thus defines two conjugate epipolar lines. Without loss of generality, assuming a rectified stereo pair of images captured by C1 and C2, each image line can be considered to be an index of an epipolar plane.

In the case illustrated in FIG. 2, the scene 220 is planar. A ray 240 arising from the center of projection 270 of the light projector unit P is shown in dotted line. The curved light segments 210 of the structured light pattern projected by the light projector unit P and reflected from the scene 220 are labelled 210*a*. 210*b*, 210*c*, 210*d* and 210*e*.

Figure 3:
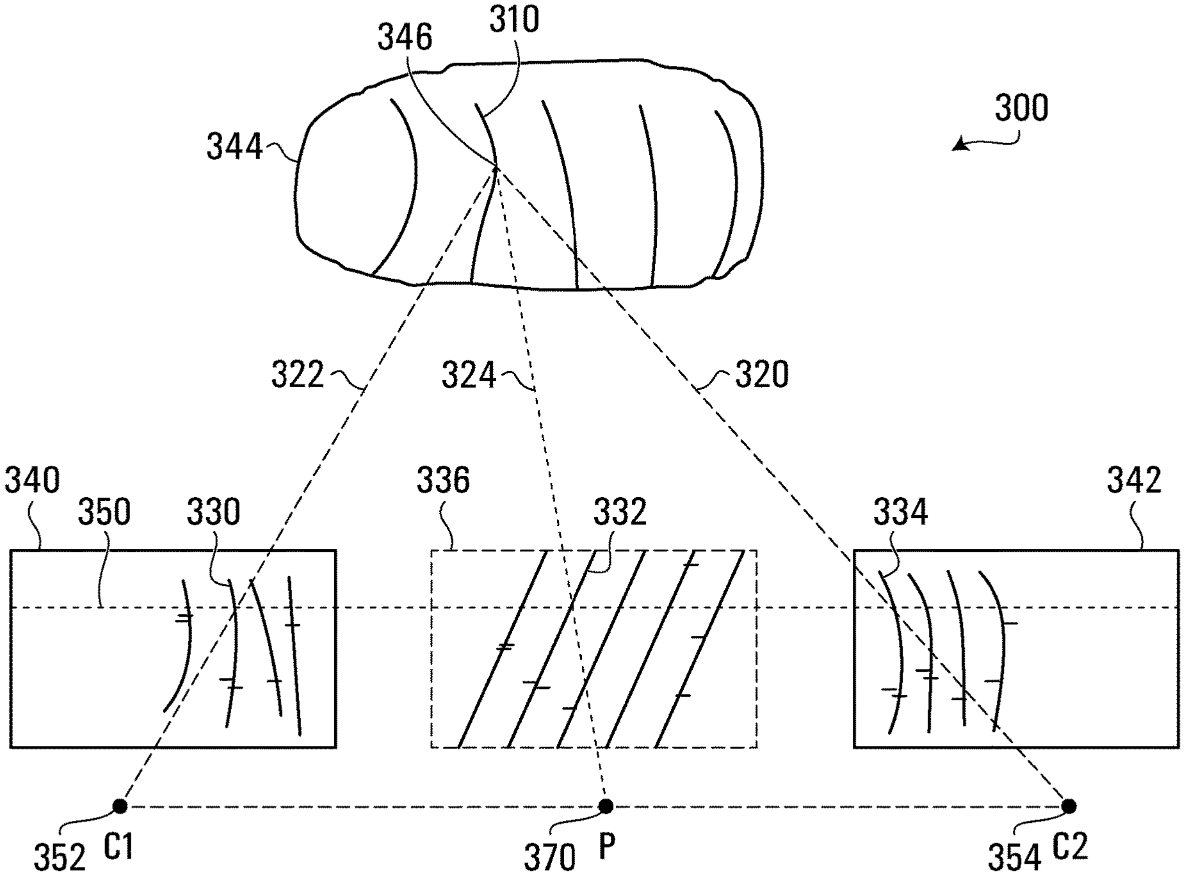
FIG. 3 depicts a view of two images, a projected pattern, and its reflection on an object in accordance with a specific embodiment.

FIG. 3 depicts a view 300 of a scene with a structured light pattern being projected from a light projector unit P onto an object 344 and the reflected contiguous light segments 310 on the object 344 that result being captured in images 340 and 342 by the two cameras C1, C2 in a frame. For each epipolar plane or equivalently, which in FIG. 3 corresponds to a specific line of pixels in the images, the continuous light segments crossing the same specific line in both images are identified to generate a list of continuous segment indices or identifiers for each image. In FIG. 3, the first camera C1 is represented by its center of projection 352 and its image plane 340. The second camera C2 is represented by its center of projection 354 and its image plane 342. The light projector unit P is illustrated by a center of projection 370 and an image plane 336. It is not necessary that the center of projection 370 of the projector be located on the baseline between the centers of projection 352, 354 of the cameras although it is the case in the example embodiment of FIG. 3.

In FIG. 3, the intersection 350 between the image planes and a specific epipolar plane is shown using a dotted line. Rays 322, 324 and 320 belong to the same epipolar plane. The light projector unit P projects at least one light stripe 332 onto the object 344, thus producing a reflected curve 310. This reflected curve 310 is then imaged in the first image captured by the first camera C1 (imaged curve 330) while it is also imaged in the second image captured by the second camera C2 (imaged curve 334). Point 346 on reflected curve 310 is then present on imaged curves 330, 334 and should be properly identified and matched in those images to allow finding its 3D coordinates. The imaged curves 330, 334 intersect the illustrated epipolar plane on intersection 350 along rays 322 and 320, originating from the reflected curve 310 on the object 344. The rays 322 and 320 entering the cameras and the ray 324 of the specific light stripe 332 all lie on the same epipolar plane and intersect at point 346.

The one or more computer processors 160 (shown in FIG. 1B) of the set of imaging modules 100 are programmed for matching the curves 330 and 334 in the images with projected light stripe 332 as having the common point of intersection at point 346 on the object 344. The projected light stripe 332 as well as the additional light stripes in the structured light pattern projected by light projector unit P are intersected by the intersection 350. The cameras C1, C2 and projector unit P are arranged so that the projected light stripes of the structured light pattern extend transversely, and in some cases orthogonally, to the intersection 350 and to the epipolar planes.

Since the light projector unit P and the cameras C1, C2 are calibrated in a same coordinate system, it is possible to derive triplets of indices where a triplet (I1, I2, IP) is composed of (i) the index of the curve in the first image I1 captured by camera C1; (ii) the index of a candidate corresponding curve in the second image I2 captured by camera C2; and (iii) the index of the elongated light stripe in the structured light pattern projected by light projector unit P. The number of possible combinations of triplets is $O(N^3)$, and grows with N, the number of light stripes in the projected structured light pattern. To limit the number of possible combinations, one may analyze the intersections of the line rays from the two cameras C1, C2 and the light projector unit P within the epipolar plane and attribute an error measure to a given intersection.

Figure 4:
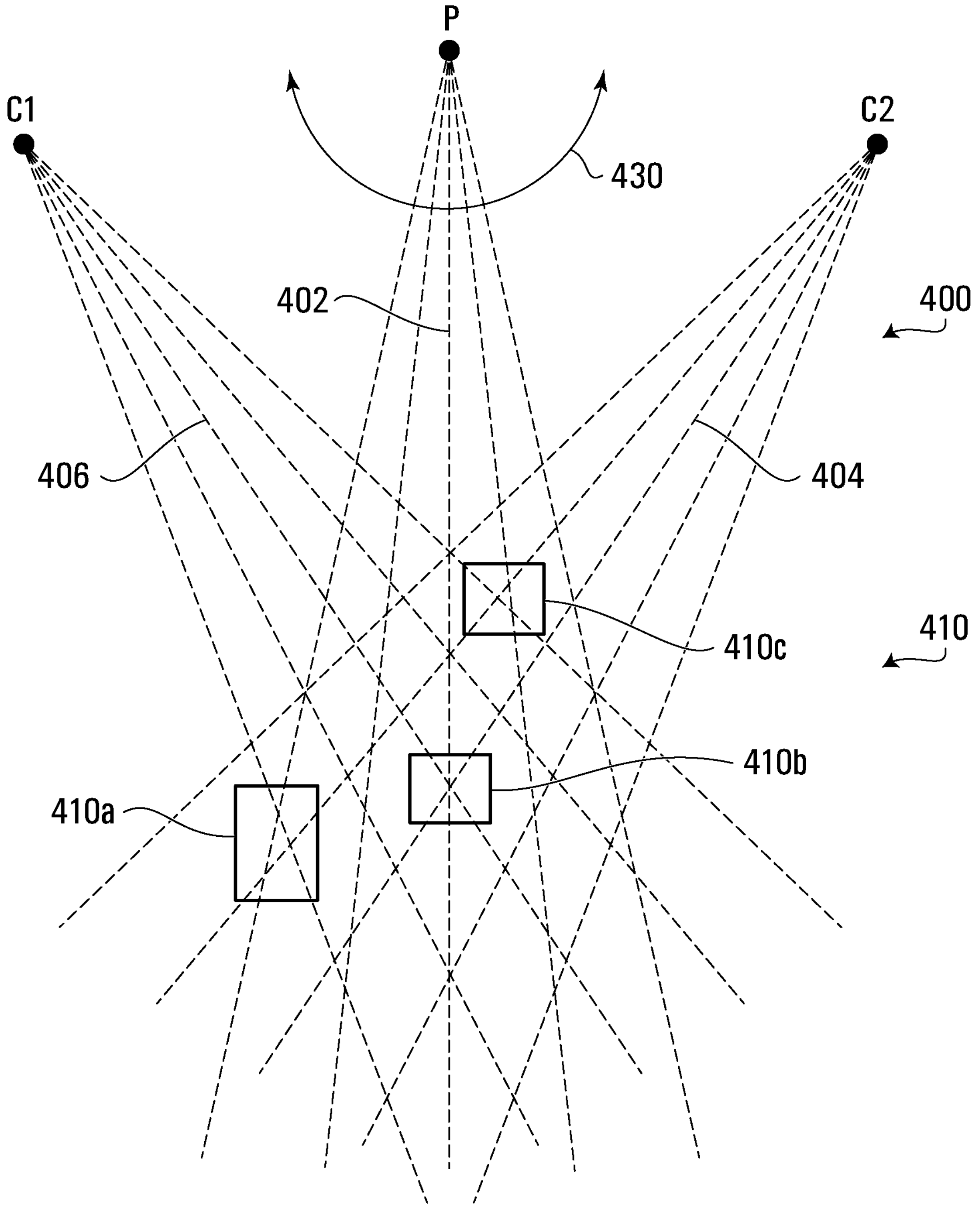
FIG. 4 is a representation of ray crossings from the two cameras and a light projector unit in accordance with a specific embodiment.

FIG. 4 is a representation 400 of ray crossings from the two cameras C1, C2 and the light projector unit P. Rays 404 and 406 are captured by cameras C2 and C1 respectively. Light stripes are projected by the light projector unit P and rays 402 are along those light stripes and in the same plane as rays 404 and 406 going into the cameras C1 and C2. For the light projector unit P, the rays can be indexed using an angle 430. Some intersections 410 are a more probable match, such as intersection 410*b* which appears to cross in a single point while other intersections, such as intersections 410*a* and 410*c* have a greater error.

Different error measurements can be attributed to an intersection. For example, the error measure can be the minimal sum of distances between a point and each of the three rays. Alternatively, the error measure can be the distance between the intersection of the two camera rays and the projector ray. Other variants are possible. The number of plausible combinations can be reduced significantly after imposing a threshold to the obtained values. When the light stripes of the projector can be approximated by planes that are indexed by an angle, the second error measure can be computed efficiently while allowing one to keep only the closest plane. This will reduce the matching complexity to $O(N^2)$.

After completing these operations, one obtains a list of triplets of potential matches where each is attributed an error and an index corresponding to a specific epipolar plane. This operation is repeated for all epipolar planes crossing continuous light segments (or blobs) in the images captures by camera C1 and C3, typically (although not necessarily) for all rows of pixels in the images.

Figure 5:
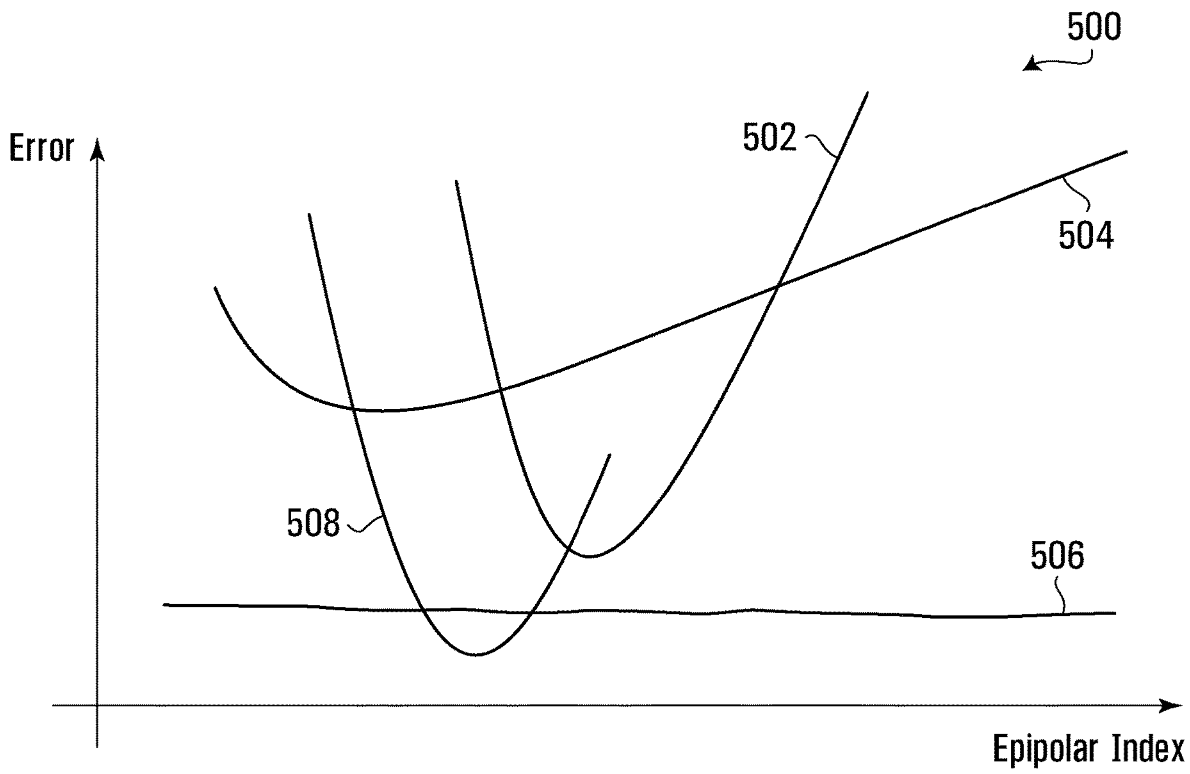
FIG. 5 depicts a graph of matching error versus epipolar index for a set of continuous segments in accordance with a specific embodiment.

The triplets along with their associated error and epipolar index are then mapped against the epipolar index. In FIG. 5, a graph 500 of the errors with respect to the epipolar index is depicted for four triplets with curves 502, 504, 506 and 508. Graph 500 combines the information for the plausible triplets and displays the error for a continuous light segment as calculated in different epipolar planes. After calculating the average error for a given curve, one obtains a figure of merit for the corresponding triplet.

In FIG. 5, the triplet whose error is depicted at curve 506 would produce the best figure of merit in this example. The average error can be further validated after applying a threshold. That is, validating matching points can include discarding matching points if the figure of merit fails to meet a quality of match threshold. One can also further validate by making sure there is no ambiguity; for short curve sections, it is possible that more than one triplet will have a similarly low average error, in which case the match would be rejected. It is worth noting that a curve may locally reach a lower minimum than the curve with the best figure of merit such as is the case with curve 508. This will happen, for instance, when the projected light sheet is not perfectly calibrated or when there is higher error in peak detection of the curves in the images. The figure of merit can also relate to the length of the blob in the image, the number of continuous segments in the epipolar plane. FIG. 5 further shows that the identified curves are not necessarily of the same length. That will depend on the visibility of the reflected curved in both images of a frame, that is if a particular continuous light segment is captured on more parts of one image (and thus on a larger number of epipolar planes) than the second image of the frame.

After completion of the matching step for images captured by cameras C1 and C2 for a given frame, measurements of 3D points may be calculated by processing the triplets. For that purpose, one may minimize the distance between the 3D point and each of the three rays in space. It is then assumed that the projected light sheets are very well calibrated, either parametrically or using a look-up table (LUT) to eventually obtain more accurate measurements. In practical applications, the projected light sheet produced through commercial optic components may not correspond exactly to a plane. For this reason, the use of a LUT may be more appropriate. Another possible approach consists in only exploiting the images from the two cameras for the final calculation of the 3D points.

Line Matching

Figure 6:
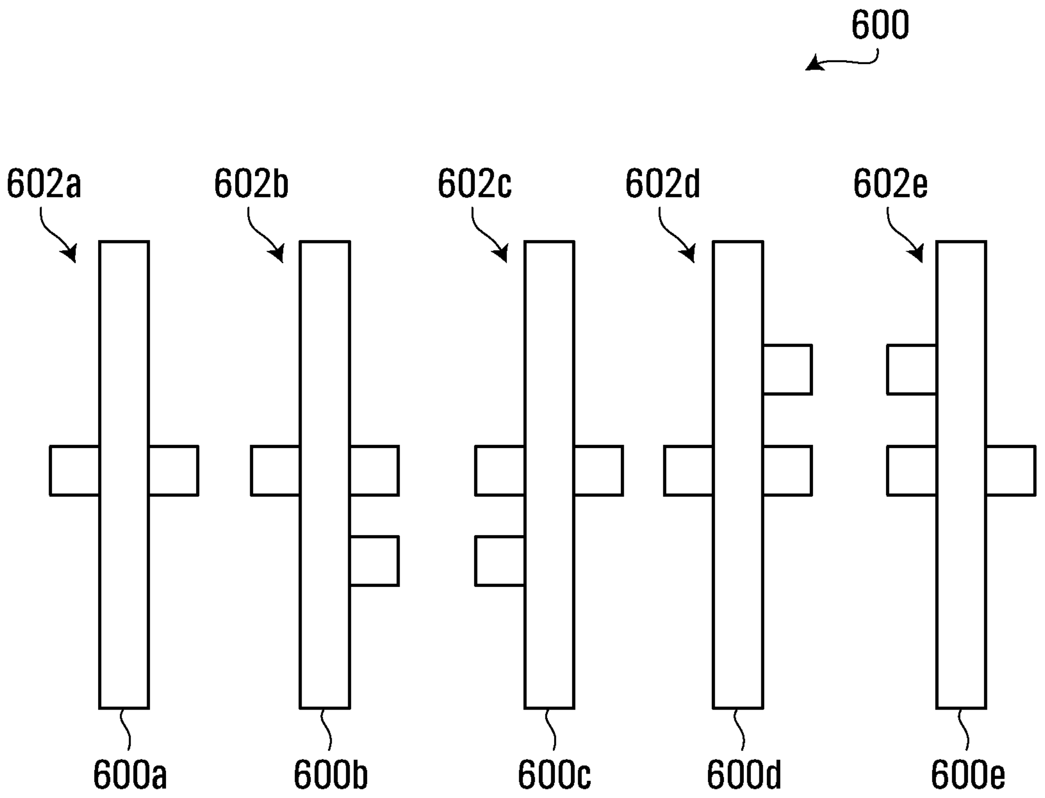
FIG. 6 shows examples of portions of projected light stripes from which extend projected discrete coded elements in accordance with a specific embodiment.
Figure 7A:
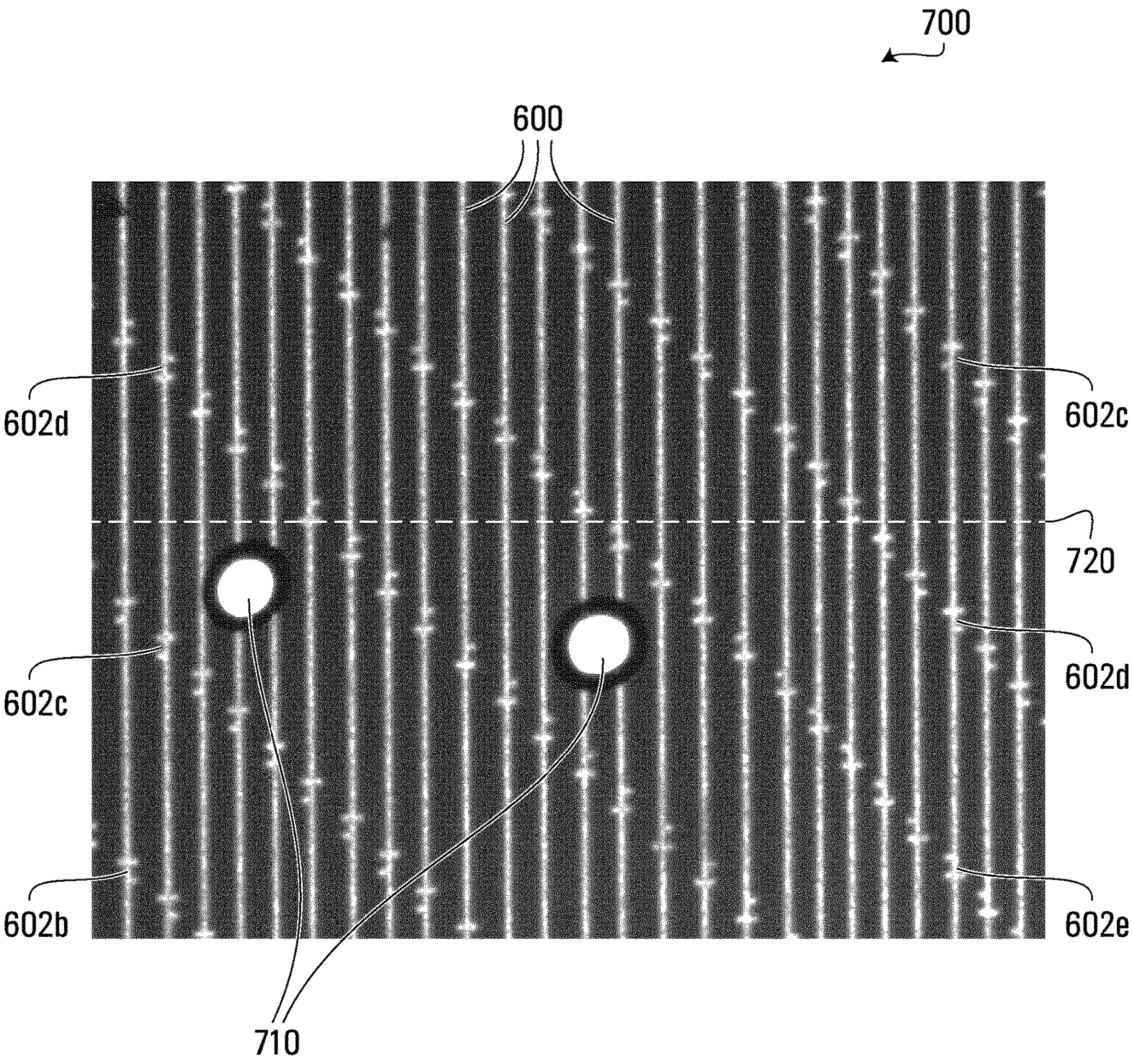
FIGS. 7A to 7E depict a structured light pattern protected by a light projector unit, the structured light pattern including elongated light stripes arranged alongside one another and discrete coded elements extending from at least some of the elongated light stripes in accordance with specific non-limiting examples.
Figure 7B:
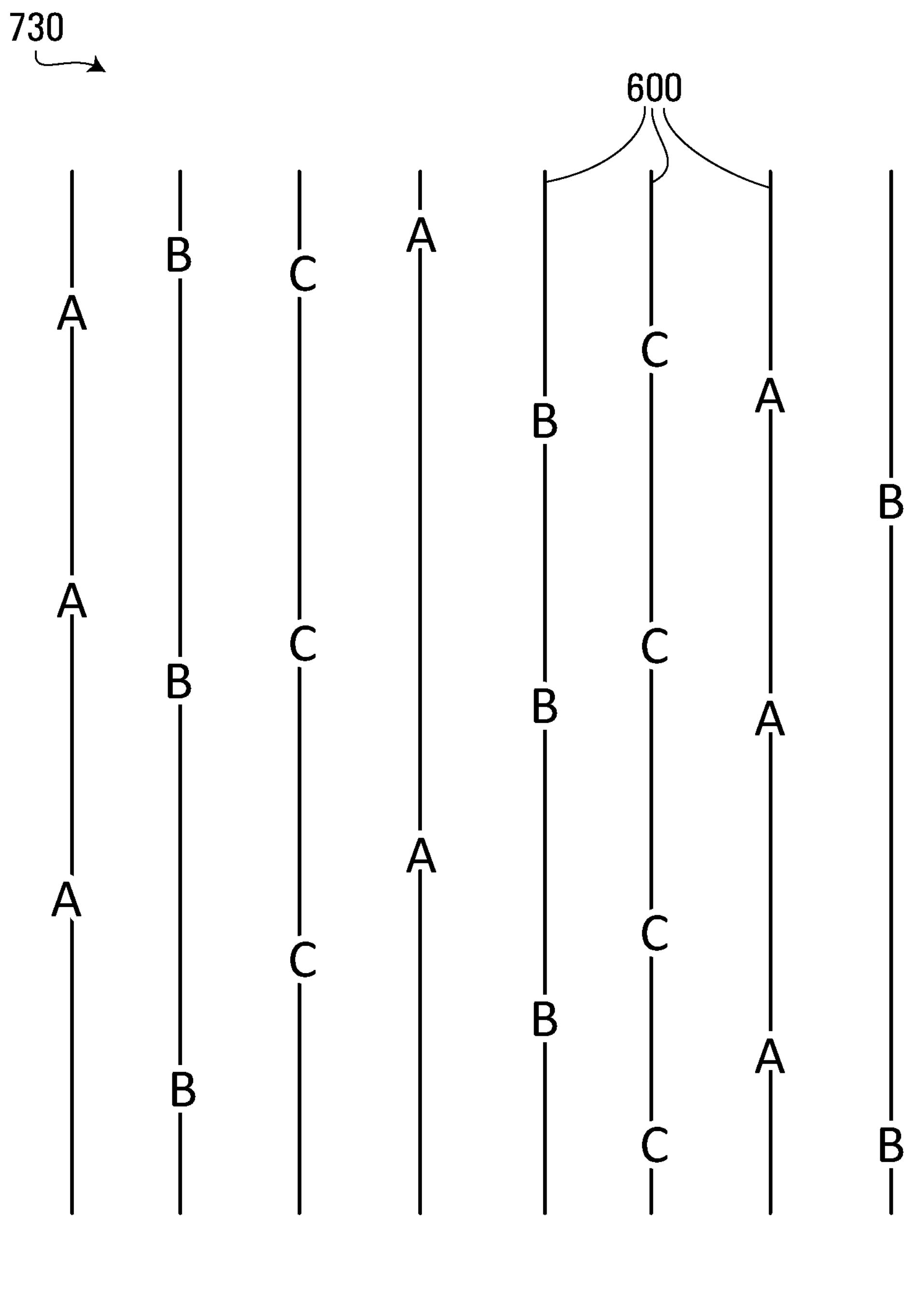
Figure 7C:
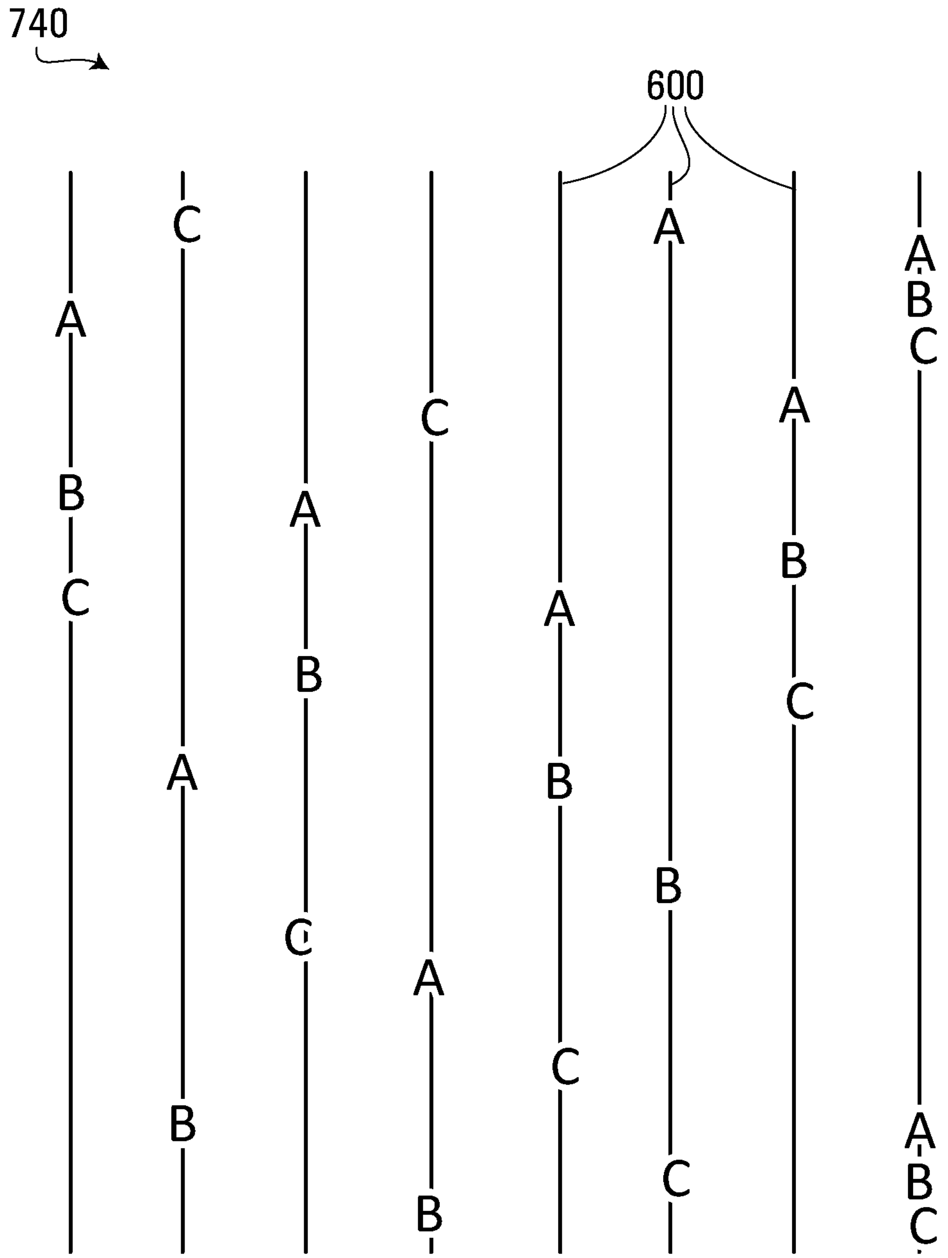
Figure 7D:
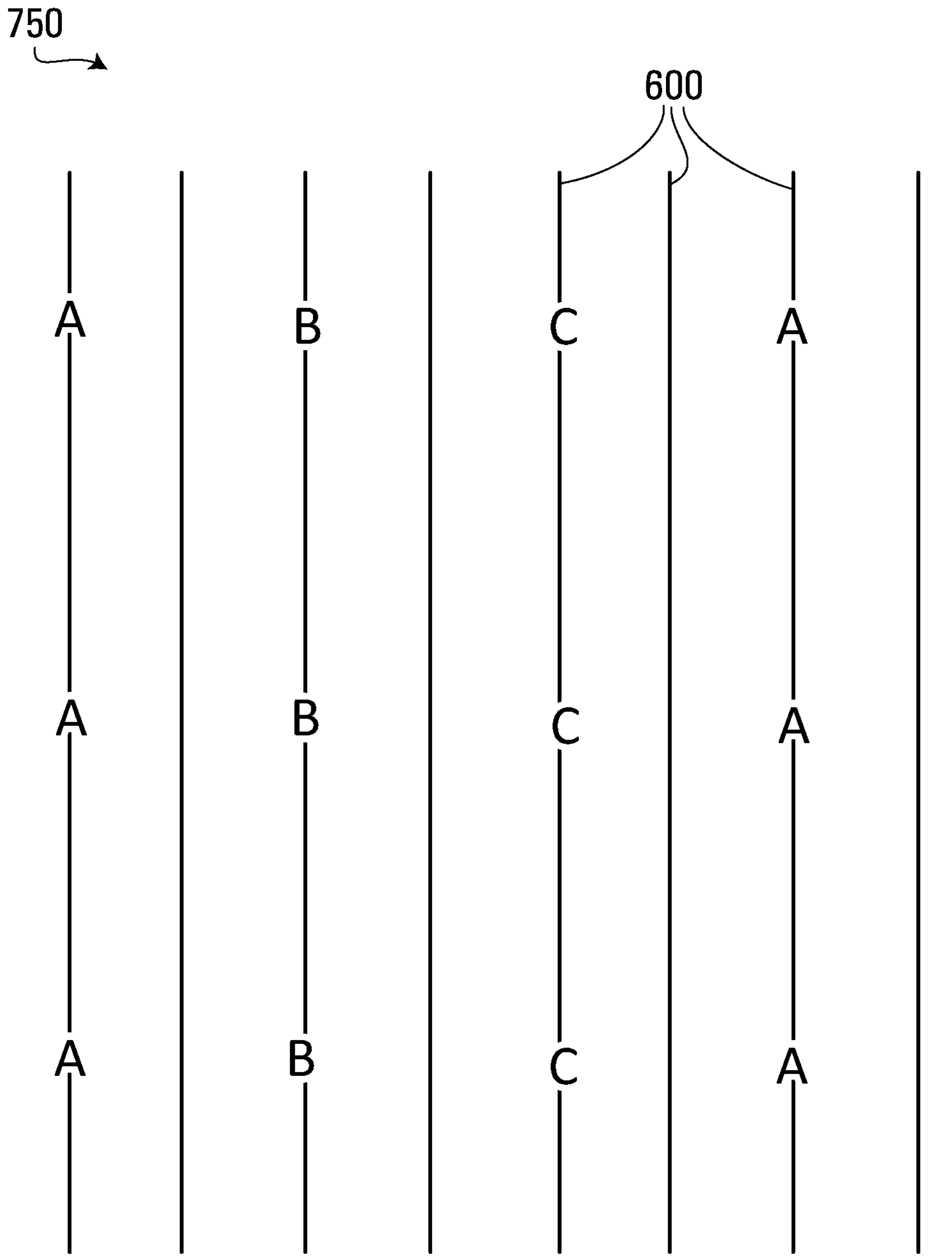

To enable matching of light stripes, the light projector unit P can be programmed to emit a structured light pattern including elongated light stripes (e.g., lines of light that include rays 402) from which extend discrete coded elements. FIG. 6 shows example portions of a plurality of projected light stripes 600, wherein each of the light stripes 600*a*. 600*b*, 600*c*, 600*d*, 600*e* includes a coded marker 602*a*, 602*b*, 602*c*, 602*d*, and 602*e* (collectively 602) projecting therefrom for assisting in the identification of a specific light stripe amongst the plurality of projected light stripes 600. The discrete coded elements 602 can be protrusions, notches, or any other discrete identifying marks that are isolated with respect to each other and extend from (are connected to) the rest of its respective light stripe 600. The discrete coded elements can be of any suitable size or shape that can be implemented as a repeating block or unit along the length of a line. Discrete coded elements of different types, for example presenting different shapes or combination of shapes, may be used in connection with the elongated light stripes. Five different types of discrete coded elements are depicted in FIG. 6, while four different types of discrete coded elements are depicted in FIG. 7A, and three different types of discrete coded elements are depicted in FIGS. 7B-7D. One type, two different types of discrete coded elements, three different types of discrete coded elements, four different types of discrete coded elements, five different types of discrete coded elements or more than five different types of discrete coded elements may also be used in alternate implementations.

Figure 7E:
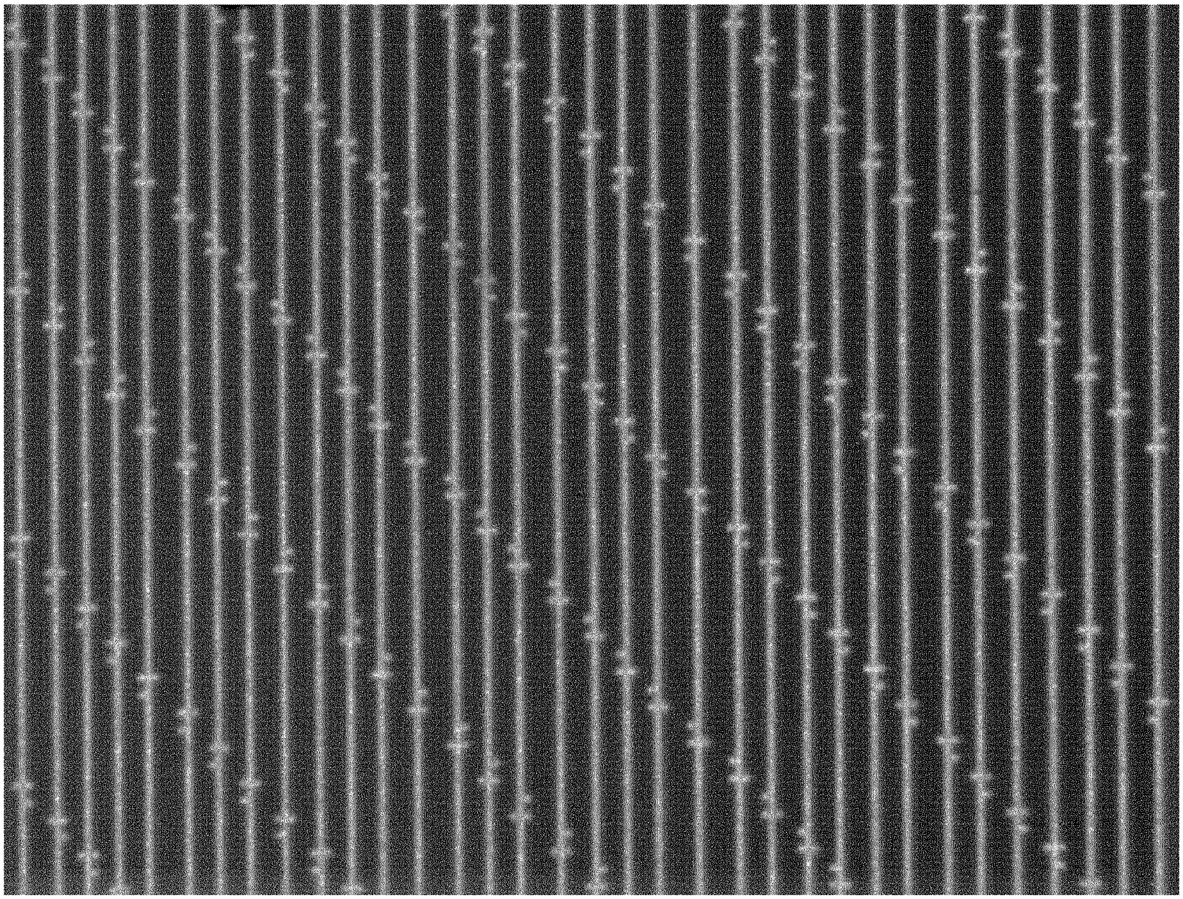

FIG. 7A shows an image of a flat surface captured by a camera (such as camera C1 or C2) that includes reflections of a structured light pattern 700 with several reflections of elongated light stripes 600, each of which includes repeating blocks of reflected discrete coded elements 602*a*, 602*b*, 602*c*, 602*d*, and 602*e* at various positions along the elongated light stripes 600. Two positioning targets 710 used to help to position the scanner in the 3d space are also visible in the image; however, the use of positioning targets 710 is not required and may be omitted in some practical implementations as shown in structured light pattern 760 in FIG. 7E.

From each of the reflected elongated light stripes 600 in the structured light pattern 700, protrudes a set of discrete coded elements 602 along the length of the light stripe 600. The differently shaped discrete coded elements 602 are located in repeating blocks at known positions along the length of each elongated light stripe 600, such that that the combination of elongated light stripes forms a known pattern with the discrete coded elements 602 at known locations and isolated from each other. In the example image of light pattern 700, four different shaped types of discrete coded elements 602*b*, 602*c*, 602*d*, and 602*e* are used. The four types of discrete coded elements 602*b*, 602*c*, 602*d*, and 602*e* are arranged to form a known overall pattern, in this case a diagonally arrange pattern. Units of each ones of the four types of discrete coded elements 602*b*, 602*c*, 602*d*, and 602*e* are located at known intervals along each light elongated light stripe 600 of the structured light pattern 700.

In some embodiments, each of the discrete coded elements 602 could appear, for example, at intervals of approximately $1/100^{th}$ the total length of a light stripe.

In the light pattern 700 in FIG. 7A, the four types of discrete coded elements 602*b*, 602*c*, 602*d*, and 602*e* repeat in sequence at regular intervals along each light stripe 600 and each sequence is diagonally offset from the other so at to form an overall diagonally arranged pattern. That is, in the specific embodiment depicted, each discrete coded element is at a different position along each light stripe 600 such that an intersecting line 720, which extends transversely, and in some cases orthogonally, across the plurality of elongated light stripes 600 does not intersect two of the same type of discrete coded elements. In other words, a line drawn across the elongated light stripes 600 will not intersect two of the same discrete coded element type in nearby elongated light stripes 600. Taking discrete coded element 602*d* as an example, a unit of the discrete coded element 602*d* is located at different heights along adjacent light stripes 600. An even line 720 across the entire set of light stripes 600 may intersect only a single unit of discrete coded element 602*d*. Alternatively, an even line 720 across the entire set of light stripes 600 may intersect multiple units of discrete coded elements 602, e.g., between 2 and 5 units. In some instances, a minimum distance separates discrete coded elements 602 of the same type. The minimum suitable distance depends on the total number of lines.

As depicted in the Figures, the structured light pattern 700 may include the discrete coded elements in an alternating sequence at regular intervals to form a diagonally arrange pattern, however other suitable arrangements of the discrete coded elements may also be contemplated and will become apparent to the person skilled in the art in view of the present disclosure. For example, in FIG. 7B, discrete coded elements (represented as A, B, C) can be arranged to form a structured light pattern 730 where a single discrete coded element type appears on a single light stripe 600 at even intervals. The sequence of discrete coded elements can repeat in a more complex pattern, or even could be in a random pattern that is known programmed into the system, such as light pattern 740 in FIG. 7C. Any coded pattern that may be detectable in images can be used provided the system is calibrated to recognize that pattern (e.g., the pattern is stored in a memory).

In some embodiments, discrete coded elements extend from each elongated light stripe in the structured light pattern, while in other embodiments discrete coded element extend from fewer than all of the light stripes. For example, ⅞, ¾, ½, ¼ or ⅛ of the light stripes can include discrete coded elements extending therefrom. FIG. 7D illustrates a structured light pattern 750 where only ½ of the elongated light stripes 600 have discrete coded elements extending therefrom, and in a pattern different than what is shown in FIGS. 7A-7C.

Method

When generating 3D data relating to a surface of a target of 3D measurements, the existence of a discrete coded element on an extended light stripe (or an absence of a discrete coded element) is information that may be used to reduce the set of plausible combinations in correctly matching continuous segments to a light stripe, and thus reduced potential ambiguities. Given a specific epipolar plane, to reduce the number of possible matches, continuities and protrusions (indicating the potential presence of discrete coded elements) in the continuous light segments are identified over multiple epipolar planes and these continuities and protrusions are used to find which set of light stripes have better correspondence. Finding a specific discrete coded element in the continuous light segments helps to identify the light stripe number and help reduces the possible number of matches. In addition, a first continuous light segment near a second continuous light segment that as been assigned an identified marker can also be more easily matched to an elongated light stripe in the structured light pattern.

Figure 8A:
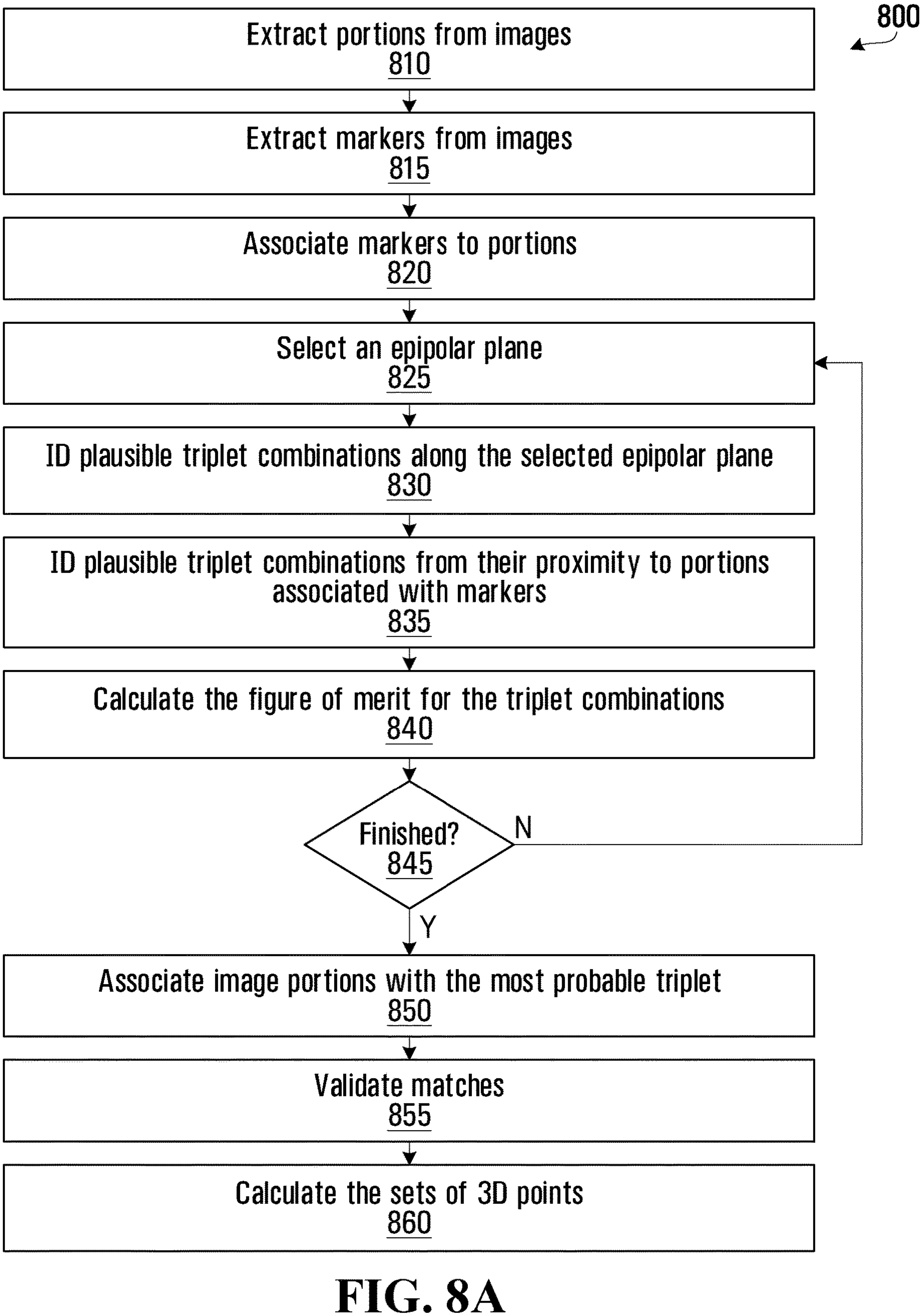
FIG. 8A is a flowchart of an example method for generating 3D data relating to a surface of a target object using a structured light pattern including light stripes from which extend discrete coded elements in accordance with a specific embodiment.

FIG. 8A is a flowchart of an example method 800 for matching and producing 3D points. At step 810, portions of images are extracted, with continuous segments being extracted from both images of a frame (taken by cameras C1 and C2). Markers (e.g., discrete coded elements 602) are extracted from the images, at step 815. The markers are associated with continuous segments, step 820. An epipolar plane is selected, step 825. Plausible triplet (or couple if only one camera is used) combinations along the selected epipolar plane are identified, step 830. Plausible triplet (or couple if only one camera is used, or quartets if four cameras are used) combinations proximal to the continuous segments associated with markers are identified, step 835. For example, a continuous segment near to the left of a continuous segment with a specific discrete coded element identified in step 830 allows the plausible combinations of continuous segments located at the right of said discrete coded element to be discarded. A figure of merit is calculated for each of the triplet combinations, step 840. If all epipolar planes have not been evaluated, the process returns to select a new epipolar plane, at step 845. When the figures of merit are calculated for the relevant epipolar planes, each image continuous segment is associated with the most probable triplet, step 850. Each match is validated, step 855. The sets of 3D points are then calculated, step 860.

Figure 8B:
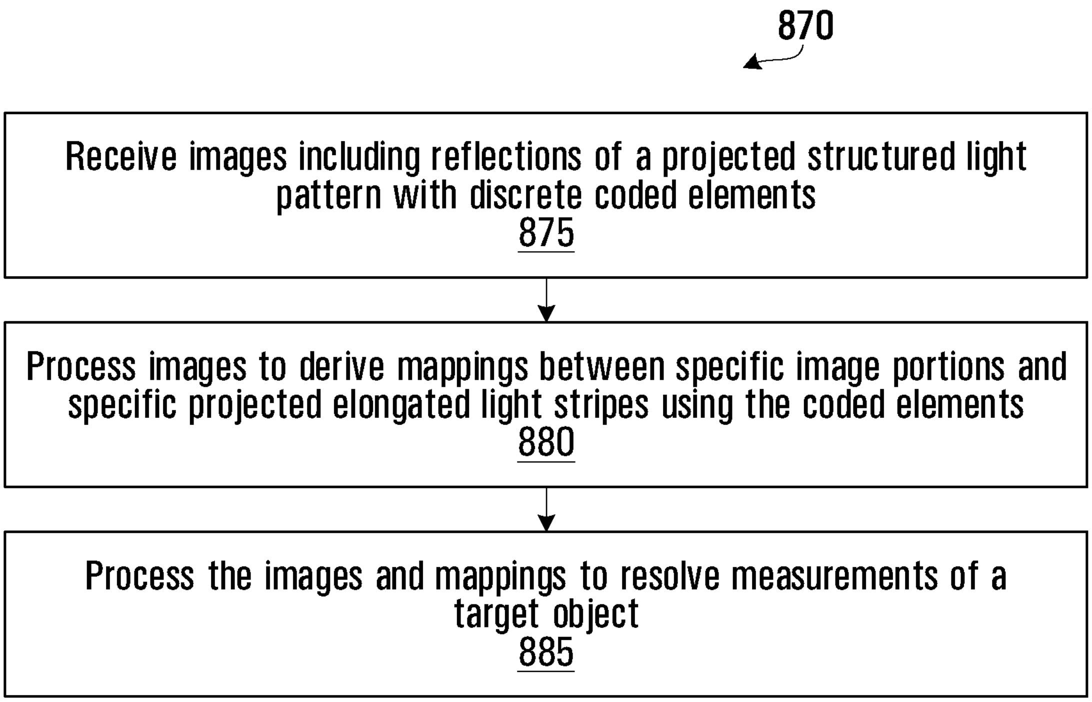
FIG. 8B is a flowchart of a second example method for generating 3D data relating to a surface of a target object using a structured light pattern including light stripes from which extend discrete coded elements in accordance with another specific embodiment.

FIG. 8B is a flowchart of an example method 870 for matching and producing 3D points. Step 875 includes receiving data captured by a set of imaging modules of a 3D scanner, the data conveying a set of images that include reflections of the projected structured light pattern from the surface of the target object that has elongated light stripes arranged alongside one another (e.g., substantially parallel to each other) as well as discrete coded elements extending from at least some of the projected elongated light stripes. Step 880 includes processing the set of images to derive mappings between specific image portions and specific projected elongated light stripes of the projected structured light pattern. The specific image portions correspond to reflections of the specific projected elongated stripes and to reflections of corresponding specific projected discrete coded elements of the projected structured light pattern, e.g., continuous segments. The mappings are derived at least in part by processing the reflections of the specific discrete coded elements in the specific image portions. Step 885 includes processing the set of images and the derived mappings between the specific image portions and the specific projected elongated light stripes to resolve measurements related to the surface of a target object. This processing is carried out to derive at least a portion of the 3D data related to a reconstructed surface for the target object. It should be apparent to the person skilled in the art that some of the steps in FIG. 8A and FIG. 8B may be performed in a different order than depicted here.

Hardware

Figure 9A:
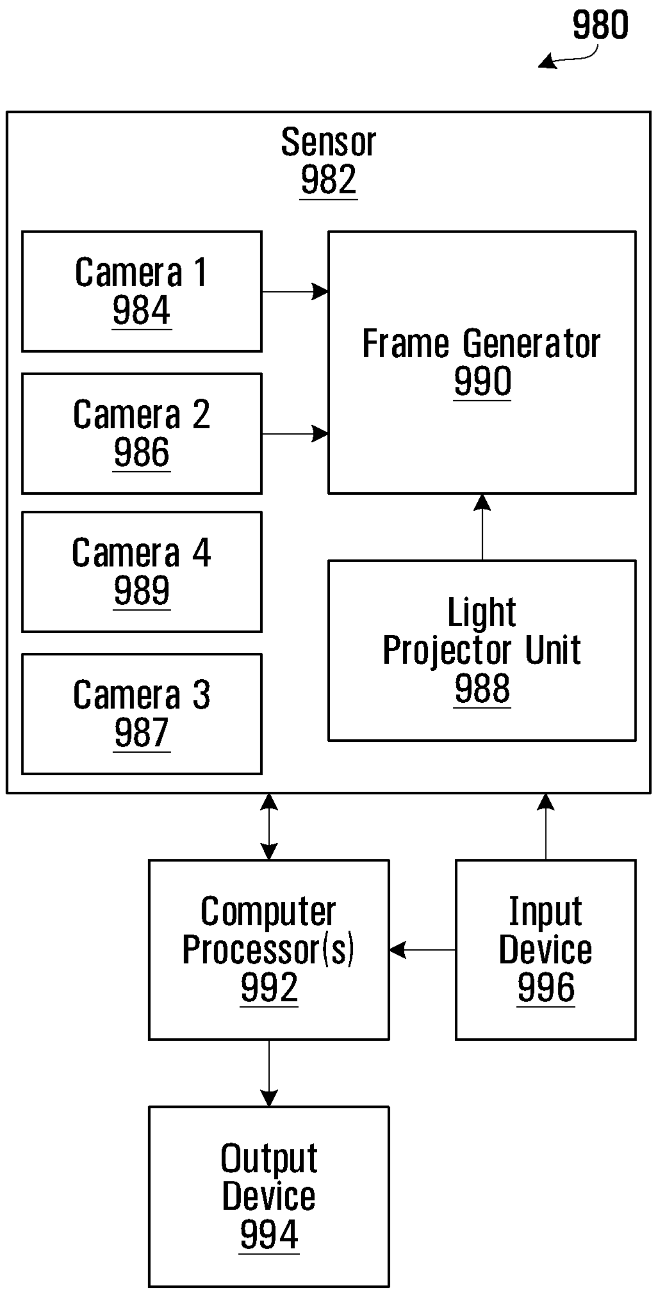
FIG. 9A is a block diagram of a system for generating 3D data relating to a surface of a target object in accordance with a specific embodiment.

FIG. 9A is a block diagram showing example components of the system 980. The sensor 982 (e.g., the set of imaging modules 100 of FIG. 1) includes a first camera 984 and a second camera 986 as well as a light projector unit 988 including at least one light projector capable of projecting light that could be laser, white or infrared. In some embodiments the sensor 982 also includes a third camera 987 and a fourth camera 989. The light projector unit 988 includes a set of discrete coded elements with the light stripes it projects. A frame generator 990 may be used to synchronize the images captured by the cameras in a single frame. The sensor 982 is in communication with at least one computer processor 992 (e.g., the computer processor 160 of FIG. 1B) for implementing the processing steps to match points between the images of the frame. The computer processor 992 is in electronic communication with an output device 994 to output the matched points and/or any additional or intermediary outputs. As will be readily understood, it may be necessary to input data for use by the processor 992 and/or the sensor 982. Input device(s) 996 can be provided for this purpose.

Figure 9B:
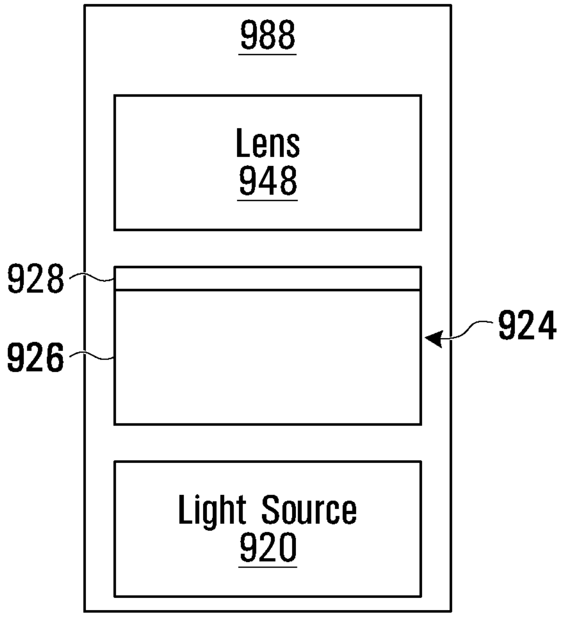
FIG. 9B is a block diagram showing a light projector unit of the scanner of FIG. 1A in accordance with a specific embodiment.

FIG. 9B is a block diagram showing example components of the light projector unit 988. In one embodiment, the light projector unit 988 includes a light source 920 and a pattern generator 924 for shaping the light emitted from the light source 126 to form the desired pattern. The light source 920 can generate infrared (IR) light. In this instance, the cameras can include suitable filters that selectively pass IR light.

The pattern generator 924 can be an optical element such as a glass layer 926 with an opaque layer 928 that selectively transmits light from the light source 920 through the glass layer 926 in the desired structured pattern. For example, the glass layer 926 can be optical glass and the opaque layer 928 can be a metallic layer formed of metallic particles that forms a film on the optical glass. The metallic particles can be chromium. The opaque layer 928 can be deposited onto the glass layer 926 to form the pattern of lines and coded elements. The opaque layer 928 can be formed using techniques such as thin film physical vapor deposition techniques like sputtering (direct current DC or radio frequency sputtering), thermal evaporation, and etching, as is known in the art. In other embodiments, the pattern generator 924 may be a liquid crystal display-type including a liquid crystal screen, or other device for creating structured light passed from the light source 920, such as using diffractive or interferential light generation methods. The translucent portions of the glass layer 926 are free from the layer of material that is opaque to the light source of the light projector unit, and so acts to shape light being projected through the pattern generator 924.

The light projector unit 988 further includes a lens 948 for projecting the structured light generated by the light source 920 and shaped by the pattern generator 924 onto the surface of the object being measured.

Referring back to FIGS. 7A-7E as well, the pattern generator 924 and the cameras 984 and 986 are oriented with respect to each other such that the emitted light stripes 600 are projected as a series of lines that can be intersected by the even line 720, where the even line 720 represents an epipolar plane of the device. The discrete coded elements 602 along the emitted light stripes 600 generated by the pattern generator are arranged such that between two and five coded elements of the same type not along the even line 720, or in some instances only one coded element of the same type is along the even line 720.

Figure 10:
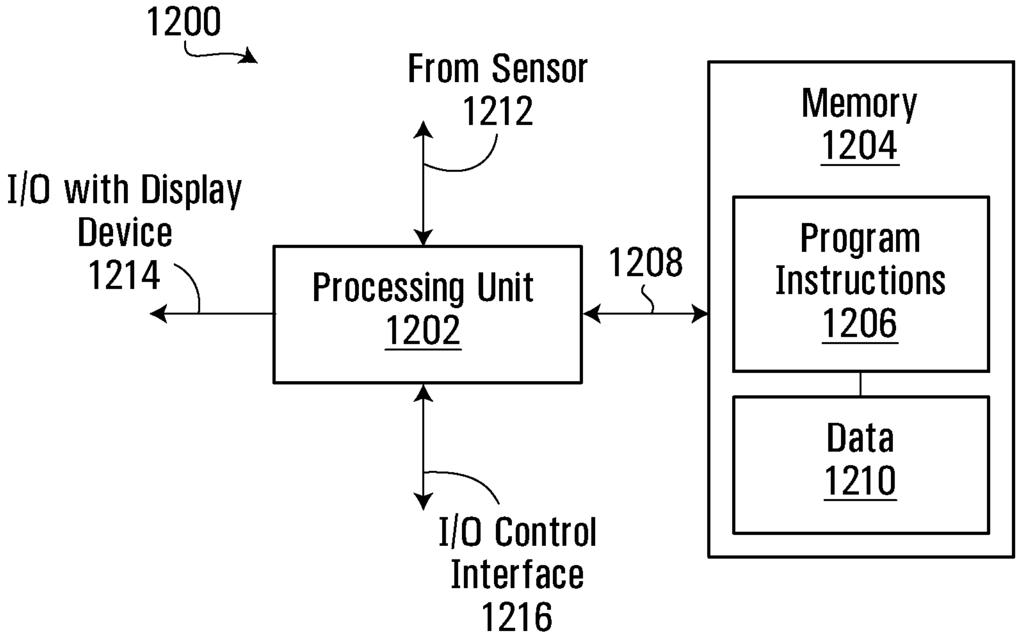
FIG. 10 is a block diagram showing components of a processing module in accordance with a specific example of implementation.

In a non-limiting example, some or all the functionality of the computer processor 992 (e.g., the computer processor 160 of FIG. 1B) may be implemented on a suitable microprocessor 1200 of the type depicted in FIG. 10. Such a microprocessor 1200 typically includes a processing unit 1202 and a memory 1204 that is connected by a communication bus 1208. The memory 1204 includes program instructions 1206 and data 1210. The processing unit 1202 is adapted to process the data 1210 and the program instructions 1206 in order to implement the functionality described and depicted in the drawings with reference to the 3D imaging system. The microprocessor 1200 may also comprise one or more I/O interfaces for receiving or sending data elements to external modules. In particular, the microprocessor 1200 may comprise an I/O interface 1212 with the sensor (the camera), an I/O interface 1214 for exchanging signals with an output device (such as a display device) and an I/O interface 1216 for exchanging signals with a control interface (not shown). The output device and the control interface may be shown on the same interface.

As will be readily understood, although the method described herein is carried out with two images thereby forming triplet combinations, in alternative implementations more than two images could be acquired per frame using addition cameras positioned at additional different known viewpoints (such as 1 camera, 2 cameras, 3 cameras, 4 cameras or even more) and the combinations could contain more than three elements. Alternatively or additionally, if more than two images are acquired per frame, the triplet combinations for two of these images could be used to match the points and the additional image(s) could be used to validate the match.

Those skilled in the art should appreciate that in some non-limiting embodiments, all or part of the functionality previously described herein with respect to the processing system of the system for displaying indications of uncertainty as described throughout this specification, may be implemented using pre-programmed hardware or firmware elements (e.g., microprocessors, FPGAs, application specific integrated circuits (ASICs), electrically erasable programmable read-only memories (EEPROMs), etc.), or other related components.

In other non-limiting embodiments, all or part of the functionality previously described herein with respect to a computer processor 160 of the set of imaging modules 100 of the scanner 10 may be implemented as software consisting of a series of program instructions for execution by one or more computing units. The series of program instructions can be tangibly stored on one or more tangible computer readable storage media, or the instructions can be tangibly stored remotely but transmittable to the one or more computing unit via a modem or other interface device (e.g., a communications adapter) connected to a computer network over a transmission medium. The transmission medium may be either a tangible medium (e.g., optical or analog communications lines) or a medium implemented using wireless techniques (e.g., microwave, infrared or other transmission schemes).

The methods described above for generating 3D data relating to a surface of a target object, may be implemented, for example, in hardware, software tangibly stored on a computer-readable medium, firmware, or any combination thereof. For example, the techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices, such as a display screen.

Those skilled in the art should further appreciate that the program instructions may be written in a number of suitable programming languages for use with many computer architectures or operating systems.

In some embodiments, any feature of any embodiment described herein may be used in combination with any feature of any other embodiment described herein.

Note that titles or subtitles may be used throughout the present disclosure for convenience of a reader, but in no way these should limit the scope of the invention. Moreover, certain theories may be proposed and disclosed herein; however, in no way they, whether they are right or wrong, should limit the scope of the invention so long as the invention is practiced according to the present disclosure without regard for any particular theory or scheme of action.

All references cited throughout the specification are hereby incorporated by reference in their entirety for all purposes.

It will be understood by those of skill in the art that throughout the present specification, the term "a" used before a term encompasses embodiments containing one or more to what the term refers. It will also be understood by those of skill in the art that throughout the present specification, the term "comprising", which is synonymous with "including," "containing," or "characterized by," is inclusive or open-ended and does not exclude additional, un-recited elements or method steps.

Unless otherwise defined, all technical and scientific terms used herein have the same meaning as commonly understood by one of ordinary skill in the art to which this invention pertains. In the case of conflict, the present document, including definitions will control.

As used in the present disclosure, the terms "around", "about" or "approximately" shall generally mean within the error margin generally accepted in the art. Hence, numerical quantities given herein generally include such error margin such that the terms "around", "about" or "approximately" can be inferred if not expressly stated.

In describing embodiments, specific terminology has been resorted to for the sake of description, but this is not intended to be limited to the specific terms so selected, and it is understood that each specific term comprises all equivalents. In case of any discrepancy, inconsistency, or other difference between terms used herein and terms used in any document incorporated by reference herein, meanings of the terms used herein are to prevail and be used.

Although various embodiments of the disclosure have been described and illustrated, it will be apparent to those skilled in the art in light of the present description that numerous modifications and variations can be made. The scope of the invention is defined more particularly in the appended claims.

What is claimed is:

1. A scanner for generating 3D data relating to a surface of a target object, the scanner comprising:

a. a scanner frame;

b. a set of imaging modules mounted to the scanner frame in an arrangement defining a plurality of epipolar planes, the set of imaging modules including:

i. a light projector unit for projecting a structured light pattern onto the surface of the target object, wherein the projected structured light pattern includes a plurality of elongated light stripes arranged alongside one another and discrete coded elements extending from at least some elongated light stripes in the plurality of elongated light stripes and wherein, for a subset of adjacent elongated light stripes in the plurality of elongated light stripes, an even line corresponding to a specific epipolar plane in the plurality of epipolar planes intersects:

A. only a single discrete coded element extending from the subset of adjacent elongated light stripes; or B. multiple discrete coded elements extending from the subset of adjacent elongated light stripes, each discrete coded element in said multiple discrete coded elements being of a different type; and ii. a set of cameras positioned alongside the light projector unit for capturing data conveying a set of images including reflections of the projected structured light pattern projected onto the surface of the target object; and c. one or more processors in communication with the set of imaging modules for receiving and processing the data conveying the set of images.

2. The scanner as defined in claim 1, wherein the light projector unit includes a light source and a pattern generator, the pattern generator including an optical element having translucent portions and opaque portions, the translucent portions and the opaque portions being arranged to shape light emitted by the light source into the projected structured light pattern.

3. The scanner as defined in claim 2, wherein the optical element includes a glass layer, the translucent portions and the opaque portions being defined upon the glass layer, and the opaque portions include a layer of material disposed on the glass layer, the layer of material being substantially opaque to the light source of the light projector unit.

4. The scanner as defined in claim 3, wherein the layer of material comprises at least one of metallic particles or a film.

5. The scanner as defined in claim 1, wherein the set of cameras includes a first camera and a second camera, wherein the first camera and the second camera are spaced from one another and oriented such as to define a baseline for the plurality of epipolar planes.

6. The scanner as defined in claim 1, wherein the discrete coded elements extending from the at least some elongated light stripes include a plurality of different types of discrete coded elements, wherein different types of discrete coded elements in the plurality of different types of discrete coded elements present different specific shapes when extending from the at least some elongated light stripes.

7. The scanner as defined in claim 6, wherein the plurality of different types of discrete coded elements includes at least two different types of discrete coded elements, at least three different types of discrete coded elements, or at least four different types of discrete coded elements.

8. The scanner as defined in claim 1, wherein:

a. a first specific elongated light stripe of the at least some elongated light stripes includes a first set of discrete coded elements, each discrete coded element of the first set of discrete coded elements being of a first type; and b. a second specific elongated light stripe of the at least some elongated light stripes includes a second set of discrete coded elements, each discrete coded element of the second set of discrete coded elements being of a second type, wherein the first specific elongated light stripe is distinct from the second specific elongated light stripe.

9. The scanner as defined in claim 1, wherein:

a. a first specific elongated light stripe of the at least some elongated light stripes includes a first set of discrete coded elements, at least some discrete coded elements of the first set of discrete coded elements being of different types and being arranged in accordance with a first coding pattern; and b. a second specific elongated light stripe of the at least some elongated light stripes includes a second set of discrete coded elements, at least some discrete coded elements of the second set of discrete coded elements being of different types and being arranged in accordance with a second coding pattern distinct from the first coding pattern.

10. The scanner as defined in claim 1, wherein specific elongated light stripes of the at least some elongated light stripes include respective sets of discrete coded elements, at least some of the discrete coded elements of each set being of different types, and the discrete coded elements of each set being arranged in accordance with a specific one of at least two distinct coding patterns.

11. The scanner as defined in claim 1, wherein a first discrete coded element extends from a first elongated light stripe of the subset of adjacent elongated light stripes and a second discrete coded element extends from a second elongated light stripe of the subset of adjacent elongated light stripes, wherein a position at which the first discrete coded element extends from the first elongated light stripe is diagonally offset from a position at which the second discrete coded element extends from the second elongated light stripe.

12. The scanner as defined in claim 11, wherein the first elongated light stripe is immediately adjacent the second elongated light stripe and wherein the first discrete coded element and the second discrete coded element are of a same type.

13. The scanner as defined in claim 1, wherein discrete coded elements extend from at least some elongated light stripes in the subset of adjacent elongated light stripes, and wherein the discrete coded elements extending from the at least some elongated light stripes in the subset of adjacent elongated light stripes are arranged to form an overall diagonally arranged pattern of discrete coded elements.

14. The scanner as defined in claim 1, wherein discrete coded elements extend from each elongated light stripe in the subset of adjacent elongated light stripes, and wherein the discrete coded elements extending from the each elongated light stripe in the subset of adjacent elongated light stripes are arranged to form an overall diagonally arranged pattern of discrete coded elements.

15. The scanner as defined in claim 1, wherein the even line intersects two discrete coded elements of a same type extending from two different elongated light stripes in the plurality of elongated light stripes, the two different elongated light stripes being separated from one another by at least a minimum number of elongated light stripes.

16. The scanner as defined in claim 15, wherein the minimum number of elongated light stripes is greater than a total number of elongated light stripes in the subset of adjacent elongated light stripes.

17. The scanner as defined in claim 1, wherein the subset of adjacent elongated light stripes includes at least three adjacent elongated light stripes, at least six adjacent elongated stripes or at least eight adjacent elongated light stripes.

18. The scanner as defined in claim 1, wherein discrete coded elements extending from a same specific elongated light stripe in the plurality of elongated light stripes are spaced apart from each other.

19. The scanner as defined in claim 1, wherein each discrete coded element of the discrete coded elements extending from the at least some elongated light stripes comprise at least one protrusion extending from the at least some elongated light stripes or at least one notch extending from the at least some elongated light stripes.

20. The scanner as defined in claim 1, wherein the projected structured light pattern includes discrete coded elements extending from fewer than all elongated light stripes in the plurality of elongated light stripes and includes discrete coded elements extending from at most one of ⅞, ¾, ½, ¼ and ⅛ of the plurality of elongated light stripes.

21. The scanner as defined in claim 1, wherein the plurality of elongated light stripes in the projected structured light pattern is comprised of non-intersecting elongated light stripes, wherein the non-intersecting elongated light stripes are substantially parallel to one another.

22. The scanner as defined in claim 1, wherein:

a. discrete coded elements extending from one elongated light stripe in the plurality of elongated light stripes assist in identifying the one elongated light stripe amongst the plurality of elongated light stripes; or b. discrete coded elements extending from specific elongated light stripes of the plurality of elongated light stripes assist in identifying the specific elongated light stripes amongst the plurality of elongated light stripes.

23. The scanner as defined in claim 1, wherein the scanner is a handheld scanner.

24. The scanner as defined in claim 1, wherein the one or more processors are configured for processing the set of images including the reflections of the projected structured light pattern to perform a 3D reconstruction process of the surface of the target object, the 3D reconstruction process being performed at least in part using the discrete coded elements extending from the at least some elongated light stripes.

25. The scanner as defined in claim 1, wherein the one or more processors are configured for transmitting the data conveying the set of images including the reflections of the projected structured light pattern to a remote computing system distinct from the scanner, the remote computing system being configured for performing a 3D reconstruction process of the surface of the target object using the data conveying the set of images including the reflections of the projected structured light pattern, the 3D reconstruction process being performed at least in part using the discrete coded elements extending from the at least some elongated light stripes.

26. A scanning system comprising:

a. the scanner as defined in claim 1; and b. a computing system in communication with said scanner, the computing system being configured for performing a 3D reconstruction process of the surface of the target object using the data conveying the set of images including the reflections of the projected structured light pattern captured by the scanner, the 3D reconstruction process being performed at least in part using the discrete coded elements extending from the at least some elongated light stripes.

27. A computer-implemented method for 3D measurement of a surface of an object, the method comprising:

a. receiving at least one image acquired by a sensor that includes reflections of a structured light pattern projected from a light projector onto the surface of the object, wherein the sensor and the light projector are arranged to define a plurality of epipolar planes, wherein the projected structured light pattern comprises a plurality of elongated light stripes and discrete coded elements extending from at least some elongated light stripes in the plurality of elongated light stripes, and wherein, for a subset of adjacent elongated light stripes in the plurality of elongated light stripes, an even line corresponding to a specific epipolar plane in the plurality of epipolar planes intersects:

i. only a single discrete coded element extending from the subset of adjacent elongated light stripes; or ii. multiple discrete coded elements extending from the subset of adjacent elongated light stripes, each discrete coded element in said multiple discrete coded elements being of a different type;

b. extracting a specific image portion at least in part by identifying areas of the at least one image corresponding to continuous segments of the reflections of the projected structured light pattern;

c. associating the specific image portion with at least one discrete coded element of the discrete coded elements; and d. determining a measurement relating to the surface of the object based on a correspondence between the specific image portion and the at least one discrete coded element.

28. The computer-implemented method as defined in claim 27, comprising labelling the specific image portion with a unique identifier.

29. The computer-implemented method as defined in claim 28, comprising:

a. selecting a specific epipolar plane of the plurality of epipolar planes; and b. identifying plausible combinations on the specific epipolar plane, the plausible combinations including a light stripe label of the plurality of elongated light stripes and the unique identifier, for a plausible continuous segment of the reflections of the projected structured light pattern selected from the continuous segments of the reflections of the projected structured light pattern in the at least one image.

30. The computer-implemented method as defined in claim 29, comprising identifying the plausible combinations by proximity to the associated at least one continuous segment of the reflections of the projected structured light pattern and the at least one discrete coded elements.

31. The computer-implemented method as defined in claim 29, comprising:

a. calculating a matching error for each of the plausible combinations;

b. determining a most probable combination by computing a figure of merit for each of the plausible combinations using the matching error to find a most probable match;

c. associating each continuous segment of the reflections of the projected structured light pattern with the most probable match; and d. calculating a set of 3D points using matching points of the most probable match.

32. The computer-implemented method as defined in claim 31, comprising validating the matching points to discard the matching points if the figure of merit fails to meet a quality of match threshold.

33. The computer-implemented method as defined in claim 27, wherein the even line intersects two discrete coded elements of a same type extending from two different elongated light stripes in the plurality of elongated light stripes, the two different elongated light stripes being separated from one another by at least a minimum number of elongated light stripes.

* * * * *